United States Patent
Inoue

(10) Patent No.: US 11,740,842 B2
(45) Date of Patent: Aug. 29, 2023

(54) SERVER FOR PROVIDING A CLOUD PRINT SERVICE, CONTROL METHOD, AND STORAGE MEDIUM FOR MANAGING PRINT DATA

(71) Applicant: CANON KABUSHIKI KAISHA, Tokyo (JP)

(72) Inventor: Go Inoue, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/393,223

(22) Filed: Aug. 3, 2021

(65) Prior Publication Data

US 2021/0373822 A1    Dec. 2, 2021

Related U.S. Application Data

(63) Continuation of application No. 16/872,989, filed on May 12, 2020, now Pat. No. 11,119,710.

(30) Foreign Application Priority Data

May 17, 2019    (JP) ................. 2019-093737

(51) Int. Cl.
    *G06F 3/12*        (2006.01)
(52) U.S. Cl.
    CPC .......... *G06F 3/1231* (2013.01); *G06F 3/1204* (2013.01); *G06F 3/1259* (2013.01); *G06F 3/1288* (2013.01)
(58) Field of Classification Search
    CPC .... G06F 3/1231; G06F 3/1204; G06F 3/1259; G06F 3/1288
    USPC ............................ 358/1.15, 1.13, 1.14, 1.1
    See application file for complete search history.

(56) References Cited

U.S. PATENT DOCUMENTS

| | | | |
|---|---|---|---|
| 8,189,225 B1 * | 5/2012 | Lo | G06F 3/1292 358/1.15 |
| 9,729,746 B1 | 8/2017 | Hong | |
| 2012/0120437 A1 | 5/2012 | Nanaumi | |
| 2015/0355873 A1 * | 12/2015 | Choi | G06F 3/1268 358/1.15 |
| 2017/0048405 A1 | 2/2017 | Park | |
| 2018/0263069 A1 * | 9/2018 | Numakami | H04W 4/70 |
| 2020/0177746 A1 * | 6/2020 | Katsumata | H04N 1/00403 |

FOREIGN PATENT DOCUMENTS

| | | |
|---|---|---|
| CN | 105323403 A | 2/2016 |
| JP | 2018069546 A | 5/2018 |

* cited by examiner

*Primary Examiner* — Henok Shiferaw
(74) *Attorney, Agent, or Firm* — Canon U.S.A., Inc. I.P. Division

(57) ABSTRACT

A cloud server offering a first cloud print service is capable of storing print data obtained from the outside, transmitting a registration request to a second cloud print service different from the first cloud print service, acquiring print data from the second cloud print service registered based on the registration request, and storing the print data acquired from the second cloud print service and the print data received from the outside through a different method. The stored print data is transmitted to a printing apparatus.

18 Claims, 22 Drawing Sheets

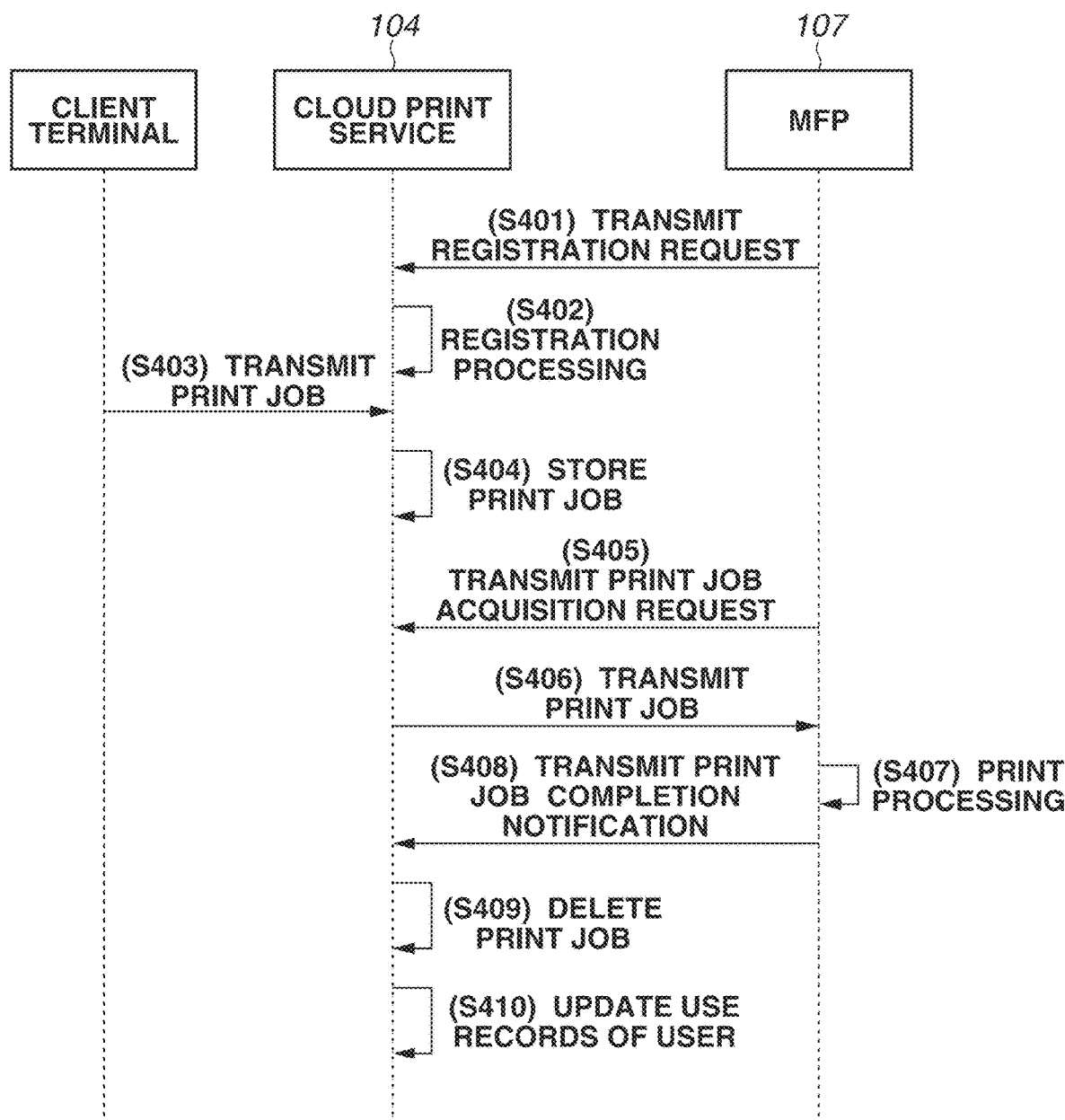

SEQUENCE OF REGISTRATION TO EXTERNAL CPS

COOPERATION SEQUENCE

Printer-name: color MFP 107
Print-color-mode-supported: auto, color , monochrome
Number-up-supported: 1,2,4,8,16
Finishing-supported: staple(4), punch(5)
Document-format-supported: pdf, jpeg, pwg-raster
Media-type-supported: auto

| NAME OF EXTERNAL CPS | REGISTRATION DESTINATION URL | COMMUNICATION PROTOCOL |
|---|---|---|
| · CPS105 | https://check.example1.jp | IPP |
| · CPS106 | https://register.example2.jp | HTTP |

| No | USER NAME | Role | Group | CPS104 Account | CPS104 password | CPS105 Account | CPS106 Account |
|---|---|---|---|---|---|---|---|
| 1 | Tom | admin | A | Tom@companyA.example0.jp | ***** | aaaTom@companyA.example1.jp | g-Tom@companyA.example2.jp |
| 2 | Alice | admin | A | Alice@companyA.example0.jp | ***** | aaaAlice@companyA.example1.jp | g-Alice@companyA.example2.jp |
| 3 | Bob | general | B | Bob@companyA.example0.jp | ***** | aaaBob@companyA.example1.jp | g-Bob@companyA.example2.jp |
| 4 | Smith | general | C | Smith@companyA.example0.jp | ***** | aaaSmith@companyA.example1.jp | g-Smith@companyA.example2.jp |

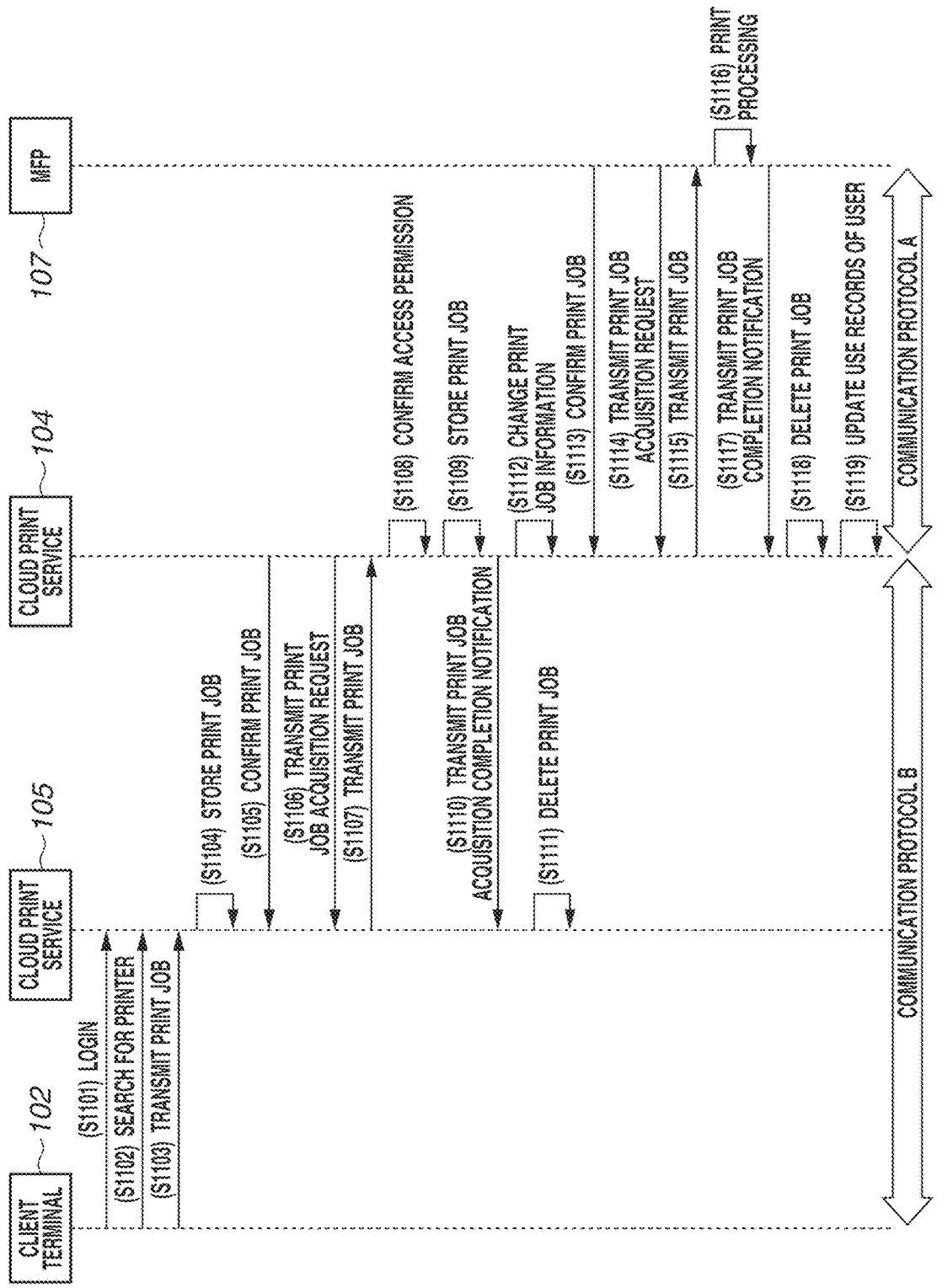

```
PRINT JOB ATTRIBUTES IN CPS 105
COMMUNICATION PROTOCOL: IPP
Job-name : data1
Requesting-user-name : aaaAlice@companyA.example1.jp
Copies : 1
Print-color-mode : auto
Document-format : PDF
```

```
PRINT JOB ATTRIBUTES IN CPS 104
COMMUNICATION PROTOCOL: HTTP
HTTP-Job-name : data1
HTTP-Job-owner-name : Alice
HTTP-Copies : 1
HTTP-Print-color-mode : auto
HTTP-Document-format : PDF
```

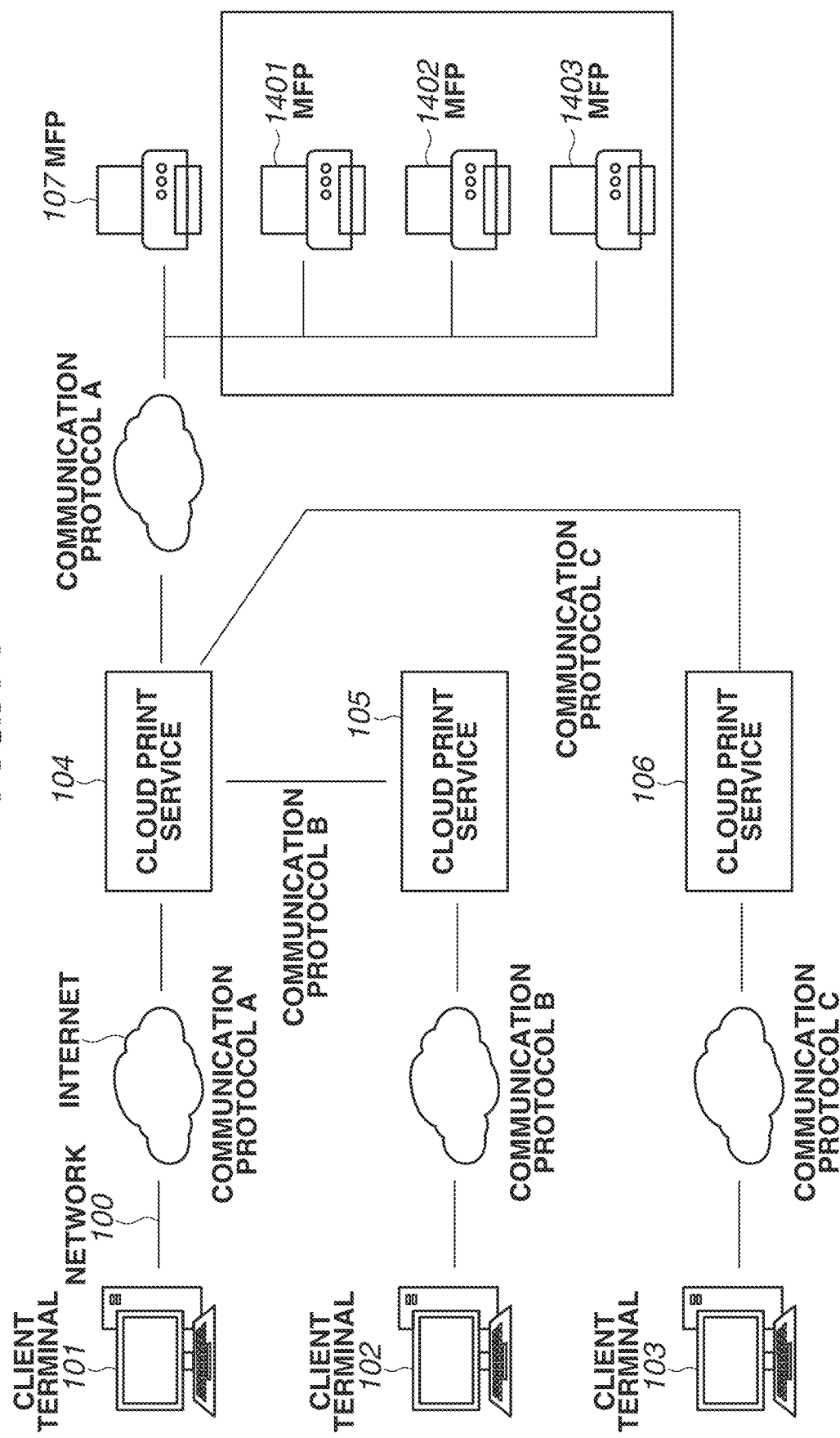

VIRTUAL PRINTER SETTING SCREEN

NAME OF VIRTUAL PRINTER TO BE GENERATED: [COLOR MFP SERIES]

SELECT SUBORDINATE PRINTERS AND SELECT OK

- ☑ COLOR MFP 107
- ☑ COLOR MFP 1401
- ☑ COLOR MFP 1402
- ☐ BW-MFP 1403

[OK]  [CANCEL]

↑ VIRTUAL PRINTER SETTINGS  ↓ CANCEL  ↘ OK

*1501*

CPS 104 REGISTERED DEVICE LIST

| No | NAME | REGISTER PRINTER TO EXTERNAL CPS |
|----|------|----------------------------------|
| ○ 1 | COLOR MFP 107 | NOT REGISTERED |
| ○ 2 | COLOR MFP 1401 | NOT REGISTERED |
| ○ 3 | COLOR MFP 1402 | NOT REGISTERED |
| ○ 4 | BW-MFP 1403 | NOT REGISTERED |

[EDIT]  [DELETE]  [COOPERATE WITH EXTERNAL CPS]

[LOG OUT]  [SET VIRTUAL PRINTER]

*1503*

CPS 104 REGISTERED DEVICE LIST

| No | NAME | REGISTER PRINTER TO EXTERNAL CPS |
|----|------|----------------------------------|
| ○ 1 | BW-MFP 1403 | NOT REGISTERED |
| ○ 2 | COLOR MFP SERIES | NOT REGISTERED |
|    | ⌐ COLOR MFP 107 | |
|    | ├ COLOR MFP 1401 | |
|    | └ COLOR MFP 1402 | |

[EDIT]  [DELETE]  [COOPERATE WITH EXTERNAL CPS]

[LOG OUT]  [SET VIRTUAL PRINTER]

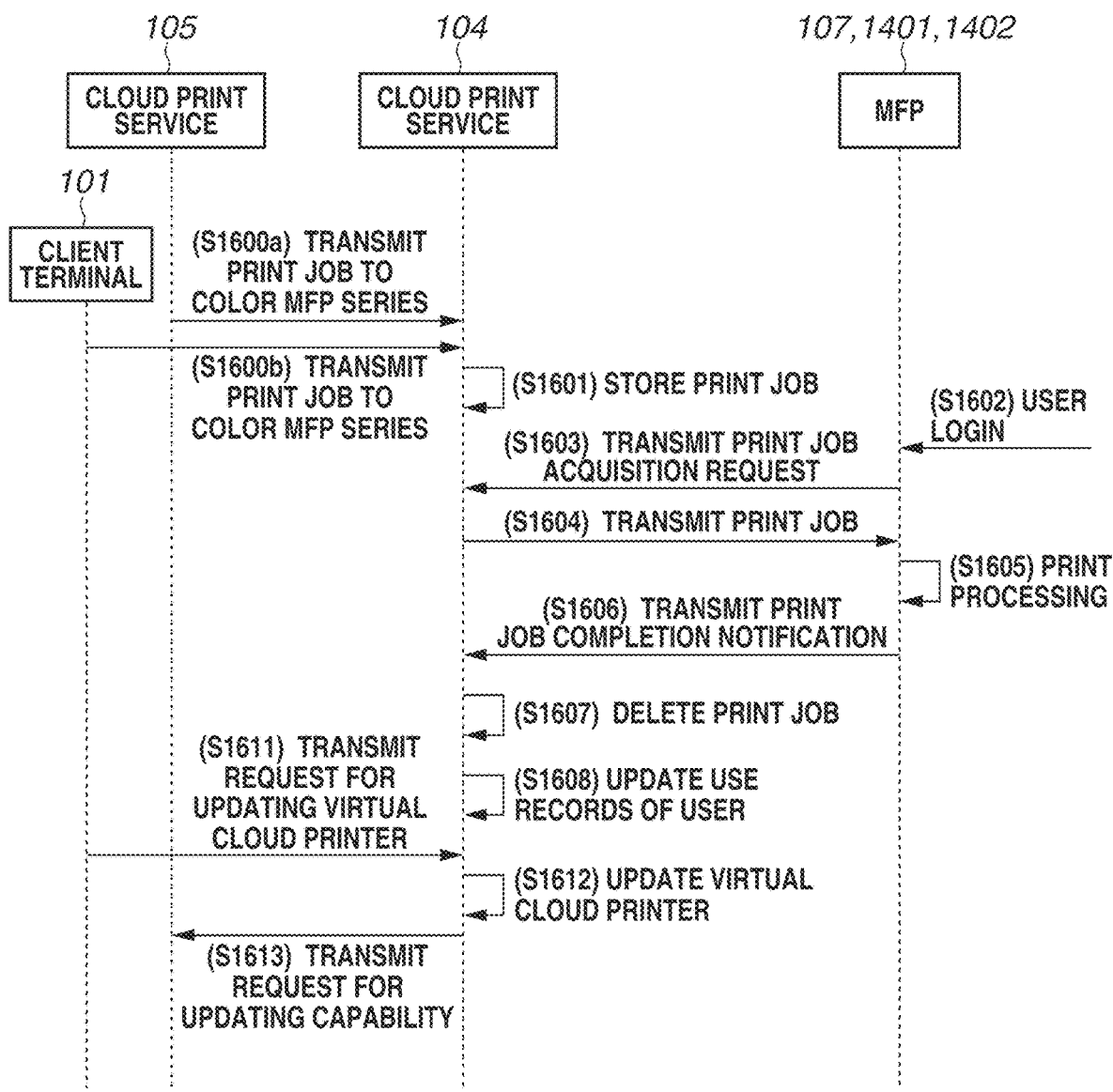

FIG.17

```
CPS105 Export File
Printer-name: Color MFP 107
Access Token: 0xfa12edb3e44...
IP address: 172.24.1.1
MAC address: 00-00-82-ab-3a-33
CPS name: CPS105
CPS URL: https://tmpcheck.example1.jp
Printer Specification
- media-type-support: auto
- number-up-support: 1,2,4,8,16
- color-mode-support: auto, color, monochrome
- finishing-support: staple(4), punch(5)
```

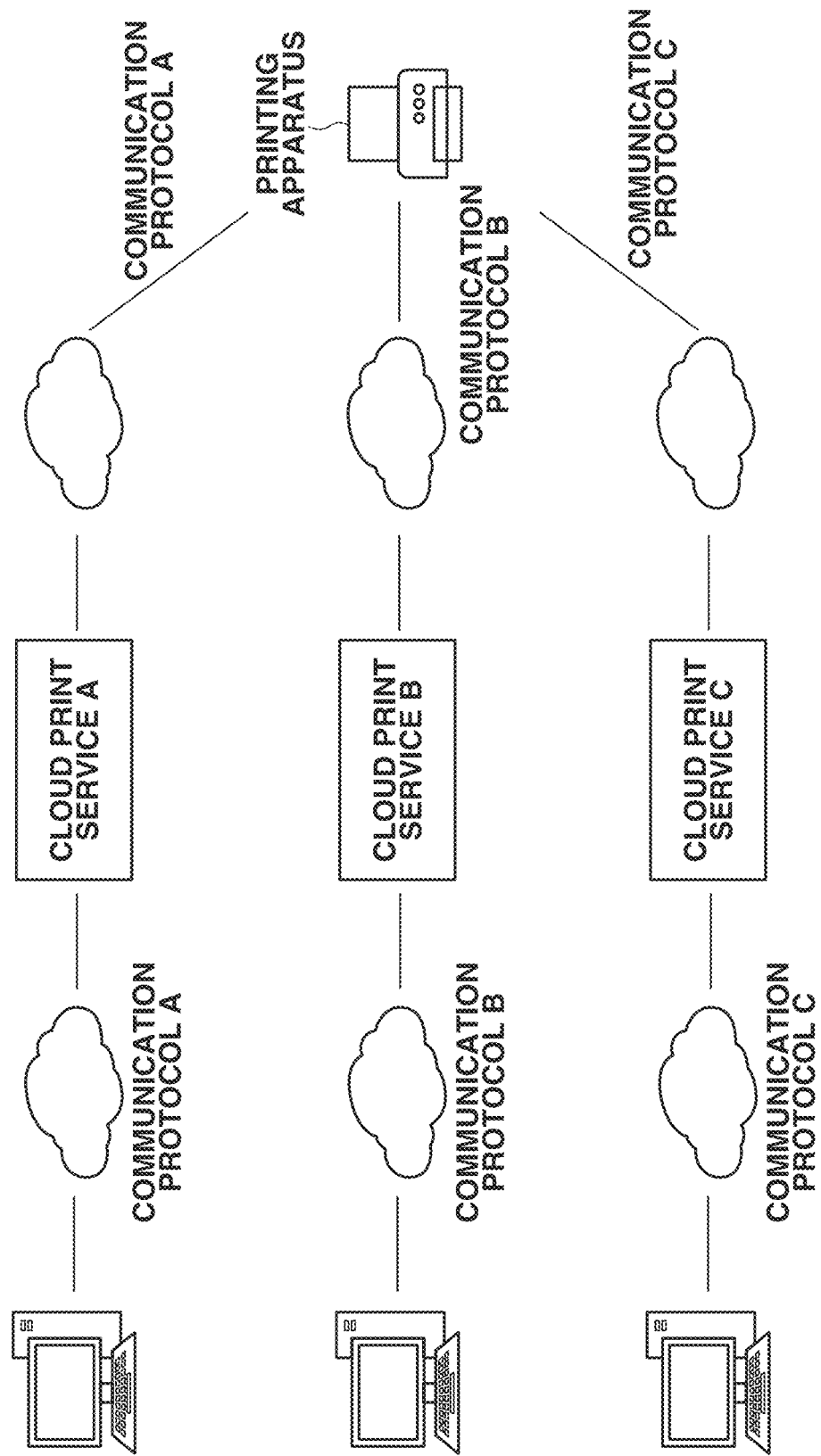

SERVER FOR PROVIDING A CLOUD PRINT SERVICE, CONTROL METHOD, AND STORAGE MEDIUM FOR MANAGING PRINT DATA

CROSS-REFERENCE TO RELATED APPLICATIONS

The present application is a continuation of U.S. patent application Ser. No. 16/872,989, filed on May 12, 2020, which claims priority from Japanese Patent Application No. 2019-093737 filed May 17, 2019, which are hereby incorporated by reference herein in their entireties.

BACKGROUND I/F THE INVENTION

Field of the Invention

The present invention relates to a server for managing print data, a control method, and a storage medium.

Description of the Related Art

In cloud print services that have been widely used in recent years, a print job is input and then transmitted to a printing apparatus via a cloud, as discussed in Japanese Patent Application Laid-Open No. 2012-133489. In such a printing system, an administrator first registers a printing apparatus to the cloud print service to which the administrator belongs. Subsequently, the administrator sets users to be permitted to use the printing apparatus.

A user permitted to use the printing apparatus inputs a print job from a client terminal to the cloud print service. The cloud print service stores the received print job in a storage. The printing apparatus acquires the print job stored in the cloud print service and then prints the print job.

Examples of cloud print services include Google Cloud Print®, Microsoft Hybrid Cloud Print®, and uniFLOW Online®.

SUMMARY OF THE INVENTION

According to an aspect of the present invention, a server for offering a first cloud print service that supplies print data obtained from an outside to a printer, includes a storage unit configured to store the print data obtained from the outside, a first transmission unit configured to transmit, to a second cloud print service different from the first cloud print service, a registration request for registering the first cloud print service as a destination printer in the second cloud print service, an acquisition unit configured to acquire, after completion of the registration of the destination printer based on the registration request, print data from the second cloud print service, and a second transmission unit configured to transmit the print data stored in the storage unit to the printer, wherein the storage unit can store the print data acquired from the second cloud print service, and print data received from a client terminal that supports the transmission of print data to the first cloud print service via a path not passing through the second cloud print service.

Further features of the present invention will become apparent from the following description of exemplary embodiments with reference to the attached drawings.

BRIEF DESCRIPTION OF THE DRAWINGS

FIG. 4 is a sequence diagram illustrating examples of printer registration processing on the CPS and print processing.

FIGS. 9A and 9B are diagrams illustrating examples of information handled by the server for offering the CPS.

FIG. 10 is a table illustrating an example of user information stored by the server for offering the CPS.

FIG. 11 is a sequence diagram illustrating an example of print processing performed via a plurality of CPSs.

FIGS. 12A and 12B are diagrams illustrating examples of attribute information included in a print job.

FIG. 14 is a diagram illustrating an example of a printing system according to a second exemplary embodiment.

FIG. 15 is a diagram illustrating examples of screens displayed on the operation unit of a client terminal according to the second exemplary embodiment.

FIG. 16 is a sequence diagram illustrating an example of printing control according to the second exemplary embodiment.

FIG. 17 is a diagram illustrating an example of import data according to a third exemplary embodiment.

FIG. 20 is a diagram schematically illustrating a prior art.

DESCRIPTION OF THE EMBODIMENTS

Figure 1:
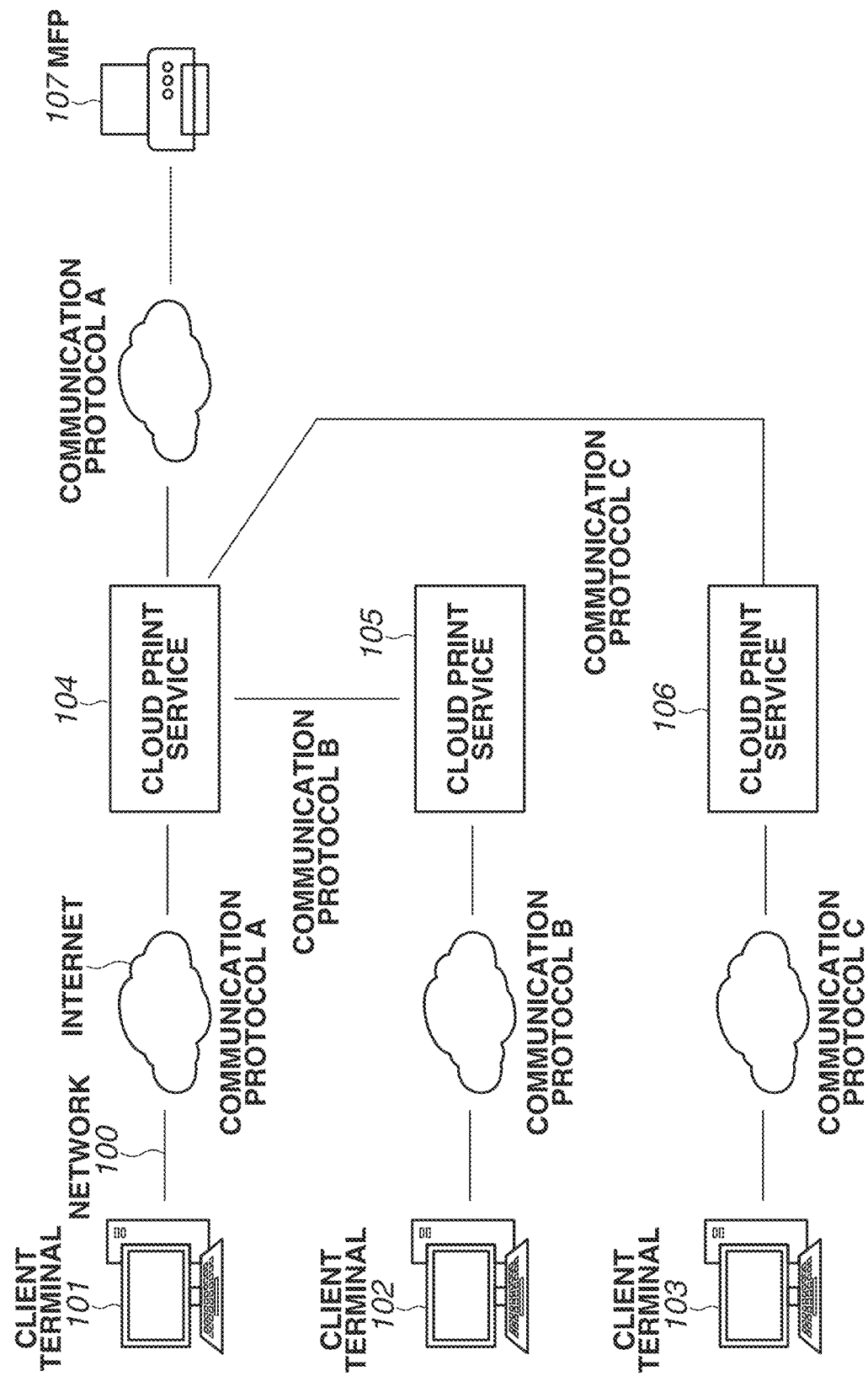
FIG. 1 is a diagram illustrating an example of a printing system.

In enterprise environments, client terminals of a plurality of operating system (OS) vendors, e.g., Windows® OS, macOS®, and Chrome® OS are used. In recent years, the increase in the use of cloud platforms has increased the number of cases where one business entity utilizes a plurality of different cloud platforms such as Amazon Web Services (AWS), Azure, and Google Cloud Platform together. In addition, there are increasing number of cases where, to allow users of each cloud platform to easily perform printing, each platform provides the users with cloud print services.

In this case, a plurality of cloud print services (e.g., cloud print services A to C) is present in a mixed manner, as illustrated in FIG. 20.

In order for a printing apparatus to support a plurality of cloud print services under such an environment, a print function for suitably receiving a print job from these cloud print services needs to be incorporated into the printing apparatus. However, a printing apparatus may not support a print function for printing a print job from a specific cloud print service depending on the release time of the printing apparatus. It is a problem that such a printing apparatus cannot be used from a specific cloud print service.

A case where a plurality of cloud print services is present in a mixed manner causes an issue that it takes a lot of time and effort when the administrator performs registration and maintenance works on a plurality of cloud print services.

A case where a plurality of cloud print services is present in a mixed manner causes another issue that access control and historical information cannot be managed in a unified manner. For example, if historical information and statistical data based on the historical information are managed by a plurality of cloud services, confirmation works by the administrator become complicated. In addition, access control setting errors may cause printing not intended by the administrator.

The present invention has been embodied in view of at least one of the above-described issues. According to an aspect of the present invention, the present invention is directed to improving the convenience in using a plurality of cloud print services. According to another aspect of the present invention, the present invention is directed to offering a mechanism for easily registering a printing apparatus registered in a first cloud print service to a cloud print service different from the first cloud print service.

Exemplary embodiments of the present invention will be described below with reference to the accompanying drawings. The following exemplary embodiments are not intended to limit the present invention according to the claims. Not all of the combinations of the features described in the exemplary embodiments are indispensable to the solutions for the present invention.

The configuration of a printing system according to a first exemplary embodiment will be described below with reference to FIG. 1. The printing system according to the first exemplary embodiment includes a multi-function peripheral (MFP) 107, client terminals 101 to 103, cloud print services (CPSs) 104, 105, and 106.

The MFP 107 has a scan function for reading a document by using a scanner to obtain an image and transmitting image-based data to an external apparatus, and a print function and a copy function for printing an image on a sheet such as paper based on a print job received from an external apparatus. The MFP 107 is also capable of receiving a print job via a cloud print service and printing the print job. Although the present exemplary embodiment will be described below exemplifying an MFP having a plurality of functions, the present invention is not limited thereto. For example, the present exemplary embodiment is also applicable to a single function peripheral (SFP) having only a print function. Although the present exemplary embodiment will be described below exemplifying printing on a sheet such as paper, the present invention is not limited thereto. The present exemplary embodiment is also applicable to print control in three-dimensional (3D) printing for forming a three-dimensional object based on three-dimensional shape data.

The printing system according to the present exemplary embodiment assumes an operation form for outputting print products by using the MFP 107 based on a plurality of different CPS s.

To implement such an operation form, the printing apparatus conventionally needs to support a plurality of cloud print services, as described above with reference to FIG. 20. The conventional form in which the printing apparatus supports each print service has an issue that old printing apparatuses cannot be used from new cloud print services.

There are other issues including an issue that it takes a lot of time and effort when the administrator performs registration and maintenance works and an issue that information cannot be managed in a unified manner. For example, if cost information and statistical data are managed by a plurality of cloud services, confirmation works by the administrator become complicated. In addition, access control setting errors may cause printing not intended by the administrator.

The printing system according to the present exemplary embodiment offers control for improving the convenience of the printing system in a case of using a plurality of CPSs in view of at least one of the above-described issues. A specific mechanism will be described below.

As described above with reference to FIG. 1, the CPS 104 is a cloud print service configured to receive a print job from the client terminal 101 and acquire print jobs stored in the external CPSs 105 and 106.

The CPSs 105 and 106 are external CPSs which receive print jobs from the client terminals 102 and 103, respectively, and store the print jobs. The CPS 104 assumes a cloud print service of a first type to be offered to users belonging to the tenant "companyA.example0.jp". The CPS 105 assumes a cloud print service of a second type to be offered to users belonging to the tenant "companyA.example1.jp". The CPS 106 assumes a cloud print service of a third type to be offered to users belonging to the tenant "companyA.example 2.jp". The present exemplary embodiment assumes that the CPSs 104, 105, and 106 are different types of cloud print services offered by different service providers.

Each of the CPSs 104, 105, and 106 exchanges information for printing based on different communication protocols A, B, and C, respectively. The MFP 107 acquires a print job stored in the CPS 104 and performs printing processing.

Those apparatuses are communicably connected via a network 100. The network 100 may be configured based on the combination of a communication network such as a local area network (LAN) and a wide area network (WAN), a public wireless communication network such as Long Term Evolution (LTE) and 5th Generation (5G), and a wireless network conforming to IEEE802.11. In other words, the network 100 only needs to be able to transmit and receive data, and any communication method of the physical layer may be used.

<Hardware Configuration>

Figure 2:
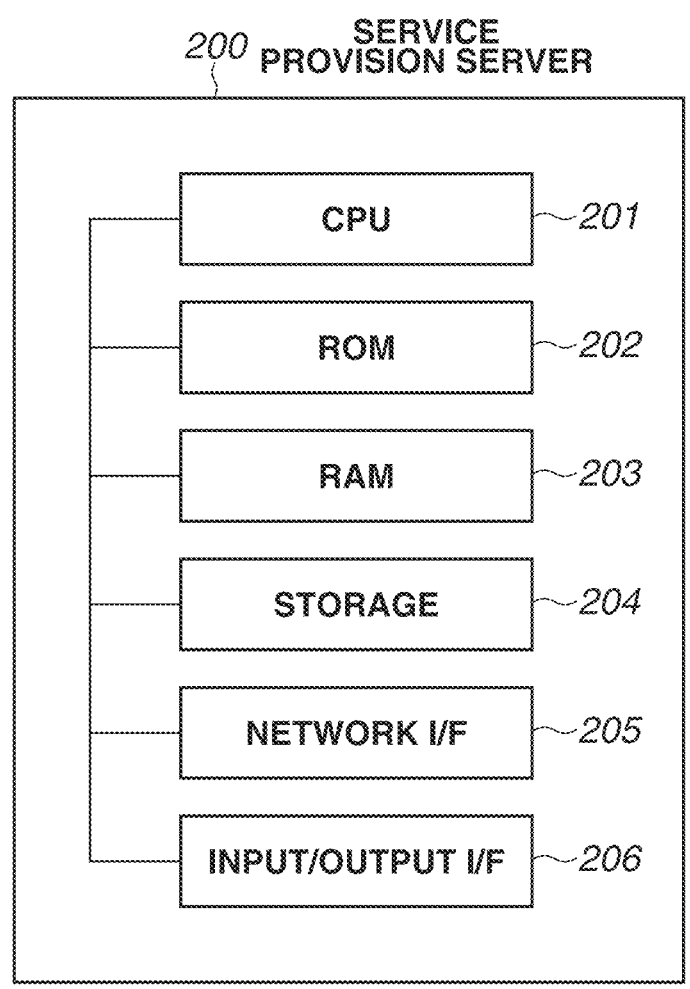
FIG. 2 is a block diagram illustrating an example of a hardware configuration of a server for offering a cloud print service (CPS).

FIG. 2 is a block diagram illustrating a hardware configuration of a server 200 as a real resource for offering the CPS 104 to the tenant "companyA" illustrated in FIG. 1. A central processing unit (CPU) 201 collaborates with each unit to control operations of the server 200. The CPU 201 reads the OS and control programs stored in a read only memory (ROM) 202 and a storage 204. The ROM 202 stores control programs executable by the CPU 201. A random access memory (RAM) 203 is the main memory of the CPU 201 and is used as a work area or a temporary storage area for loading various control programs. The storage 204 stores print data, image data, various programs, and various setting information. Although the present exemplary embodiment assumes an auxiliary storage device such as a hard disk drive (HDD) as the storage 204, a nonvolatile memory such as a solid state drive (SSD) is also usable instead of the HDD. In this way, the CPU 201, the ROM 202, the RAM 203, and other hardware components configure so-called a computer. The server 200 may further include an application specific integrated circuit (ASIC) for rendering print data. Although the present exemplary embodiment will be described below centering on an example case where one CPU 201 performs each piece of processing in the flowcharts (described below)

by using one memory (RAM 203), other configurations are also applicable. For example, a plurality of processors, a plurality of RAMs, a plurality of ROMs, and a plurality of storages are operated in collaboration to execute each piece of processing illustrated in the flowcharts (described below). A plurality of server computers can be used to execute each piece of processing. The server 200 can offer the cloud print service of the first type to a plurality of different tenants by using containerization and virtualization techniques.

A network interface (I/F) 205 is an interface for performing network communication with an external apparatus. The server 200 is connected to the network 100 via the network I/F 205. An input/output I/F 206 is an interface for connecting I/O devices such as a keyboard, mouse, and display. For example, each I/O device connected to the input/output I/F 206 is used for the maintenance of a real server for offering cloud services.

<Software Configuration>

Figure 3:
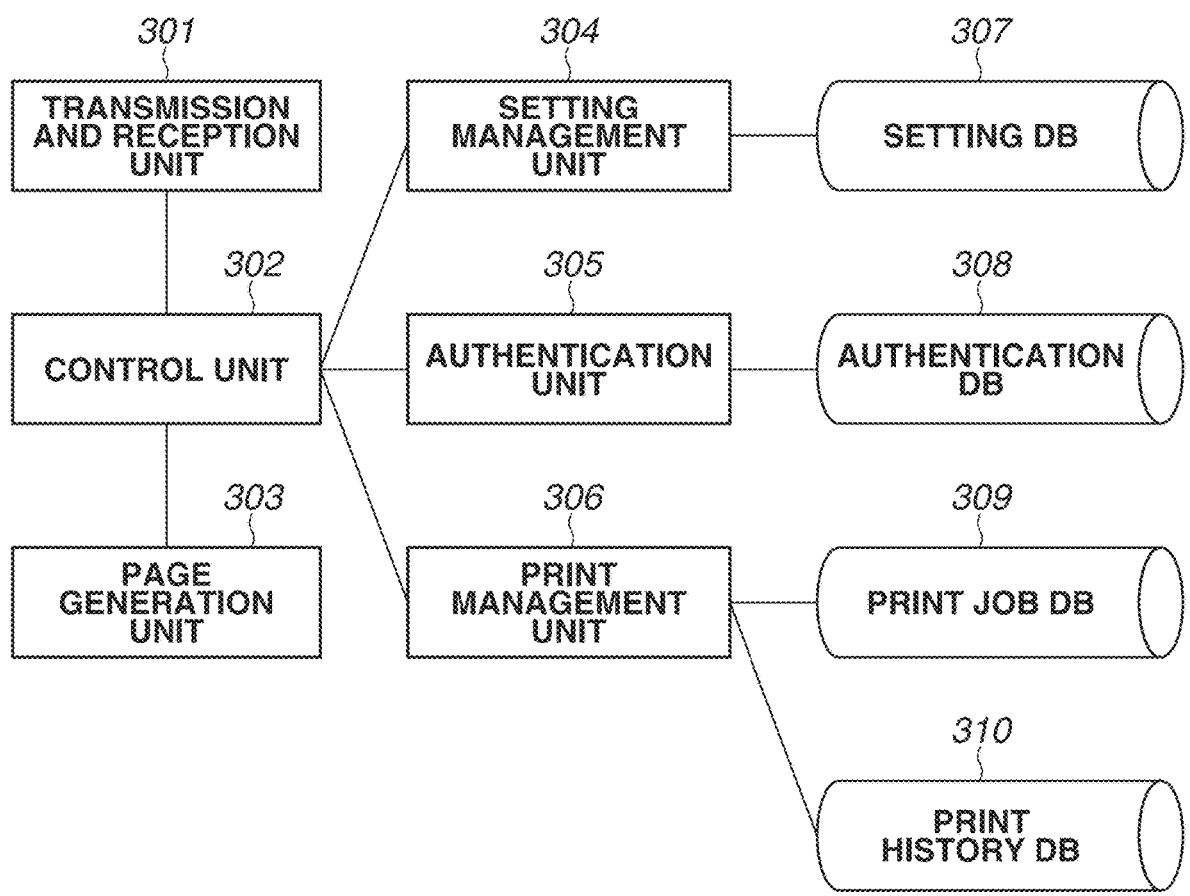
FIG. 3 is a block diagram illustrating an example of a software configuration of the CPS.

FIG. 3 is a block diagram illustrating a configuration of a software module operating on the CPS 104. Each software module stored in the storage 204 illustrated in FIG. 2 is loaded in the RAM 203 and then executed by the CPU 201.

A transmission and reception unit 301 performs communication with the web browser or print client of the client terminal 101 and the MFP 107 via the network I/F 205. A control unit 302 performs processing in response to a request received by the transmission and reception unit 301. A page generation unit 303 generates a web page for returning a response to the web browser. A setting management unit 304 controls the storage of various setting information about the CPS 104, information about the external CPS to cooperate with, and information about the MFPs registered in the CPS 104 in a setting database (DB) 307. An authentication unit 305 performs authentication processing for the user who issued a login request to the CPS 104 and issues a user authentication request to the external CPS by using an authentication DB 308 storing information about users belonging to each tenant. A print management unit 306 controls storage of a print job received from the client terminal 101 or a print job acquired from the external CPS in a print job DB 309 and performs rendering and other image processing on the print job. Rendering may be performed in cooperation with other hardware components. The print management unit 306 totalizes printing-related use statuses including users' use records and the number of printed sheets per month and stores the results in a print history DB 310.

The present exemplary embodiment is assumed that the implementation of CPSs corresponds to a multi-tenant architecture. In this architecture, modules of the application layer are executed by using a common module, and the database for managing user-specific data is separately managed for each tenant. However, it is not limited thereto. Any methods for implementing the multi-tenant architecture are usable.

<Processing of Printer Registration to CPS 104>

Processing of printer registration to the CPS 104 will be described below with reference to FIG. 4. FIG. 4 illustrates an example of a sequence for registering a printer to the CPS 104. A case where the MFP 107 is registered as a printer usable from the CPS 104 will be described.

In step S401, the MFP 107 transmits a registration request to the CPS 104. Upon reception of the registration request, in step S402, the CPS 104 registers the MFP 107 as a printer usable for the cloud print service of the first type. Upon completion of the registration of the MFP 107, printing can be performed, via the CPS 104, from a client terminal in which a print client supporting the cloud print service of the first type is installed.

Consequently, print control will be described with reference to step S403 and subsequent steps. Upon reception of the user operation for performing printing by using a cloud printer registered in the CPS 104, in step S403, the client terminal generates a print job and transmits the generated print job to the CPS 104. The print job transmitted to the CPS 104 includes print data, print settings (print attributes), and information for identifying users and tenants.

Upon reception of the print job, in step S404, the CPS 104 stores the print job in the print job DB 309. In step S405, the MFP 107 transmits a print job acquisition request to the CPS 104. Upon reception of the request, in step S406, the CPS 104 transmits the print job to the MFP 107. Upon reception of the print job, in step S407, the MFP 107 performs print processing and outputs a print product. Upon completion of the execution of the print job, in step S408, the MFP 107 transmits to the CPS 104 a notification indicating that the print job is completed. Upon reception of the notification, in step S409, the CPS 104 deletes the print job. In step S410, the CPS 104 accesses the print history DB 310 to update the use records of the user. More specifically, the CPS 104 updates the use records of the user in association with the user who transmitted the print job. The use records of the entire tenant will be also updated at this timing. The print history information will be also updated. The above-described series of processing enables the user to use the MFP 107 via the CPS 104.

<Cooperation Between CPS 104 and External CPS>

Figure 5A:
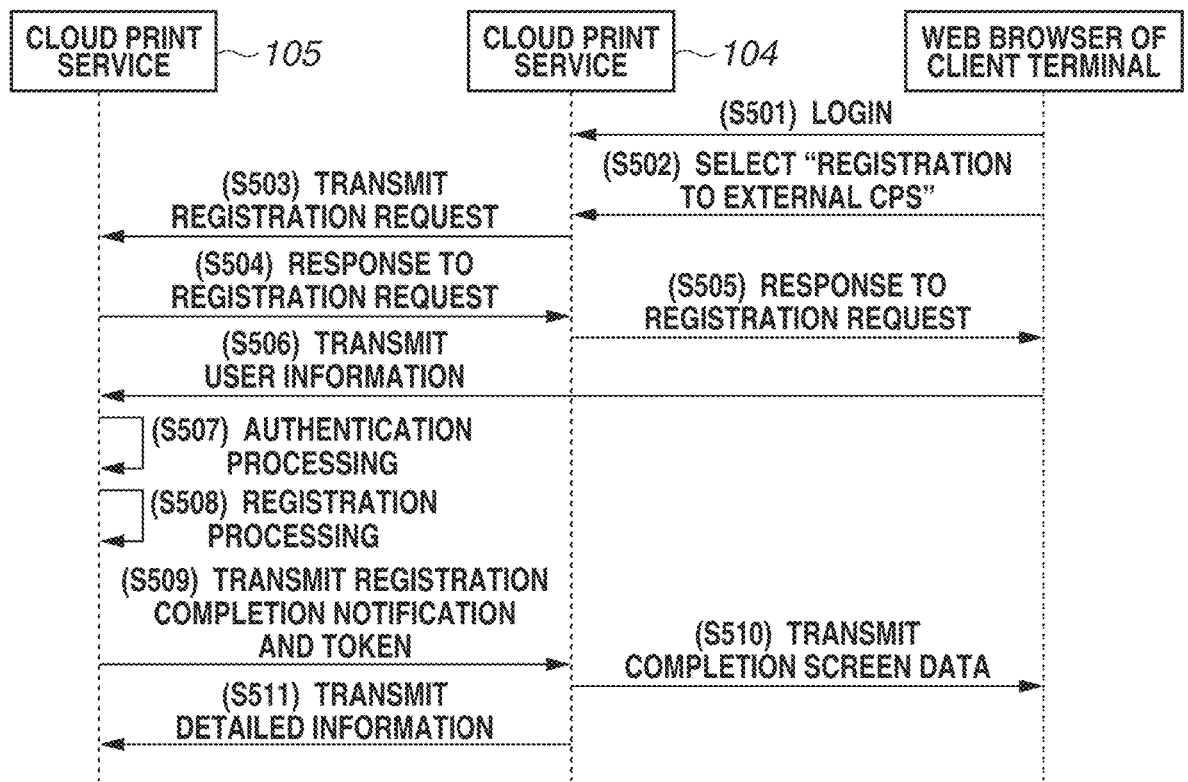
FIGS. 5A and 5B are sequence diagrams illustrating examples of printer registration processing on an external CPS and cooperation processing.
Figure 5B:
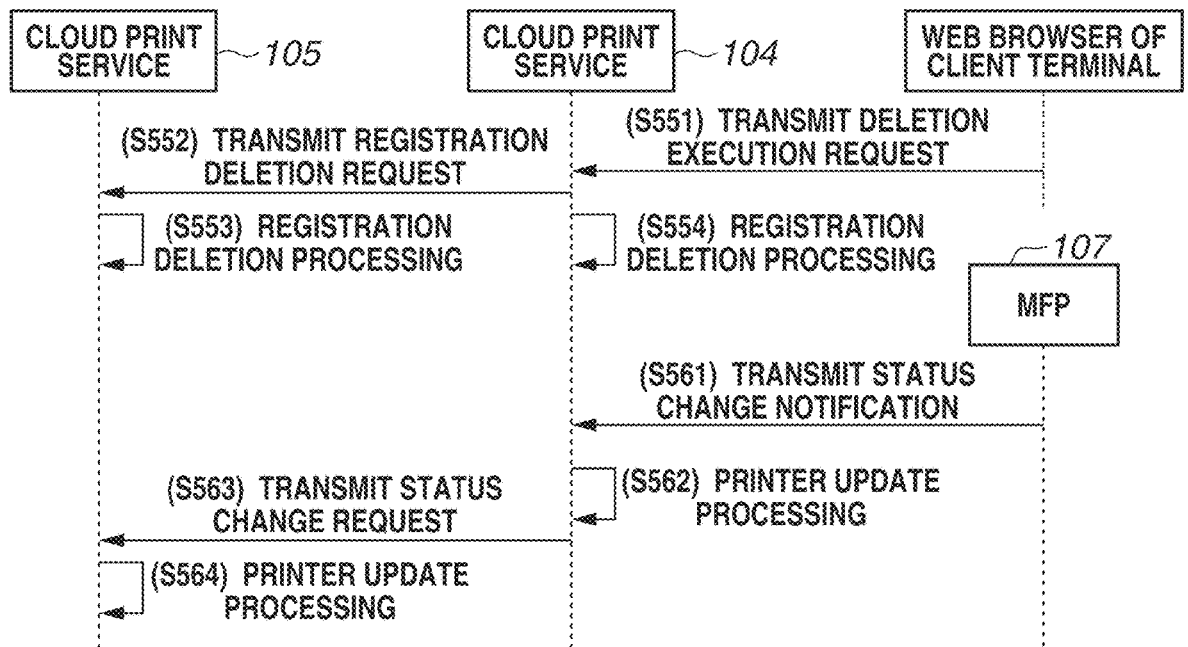
Figure 6A:
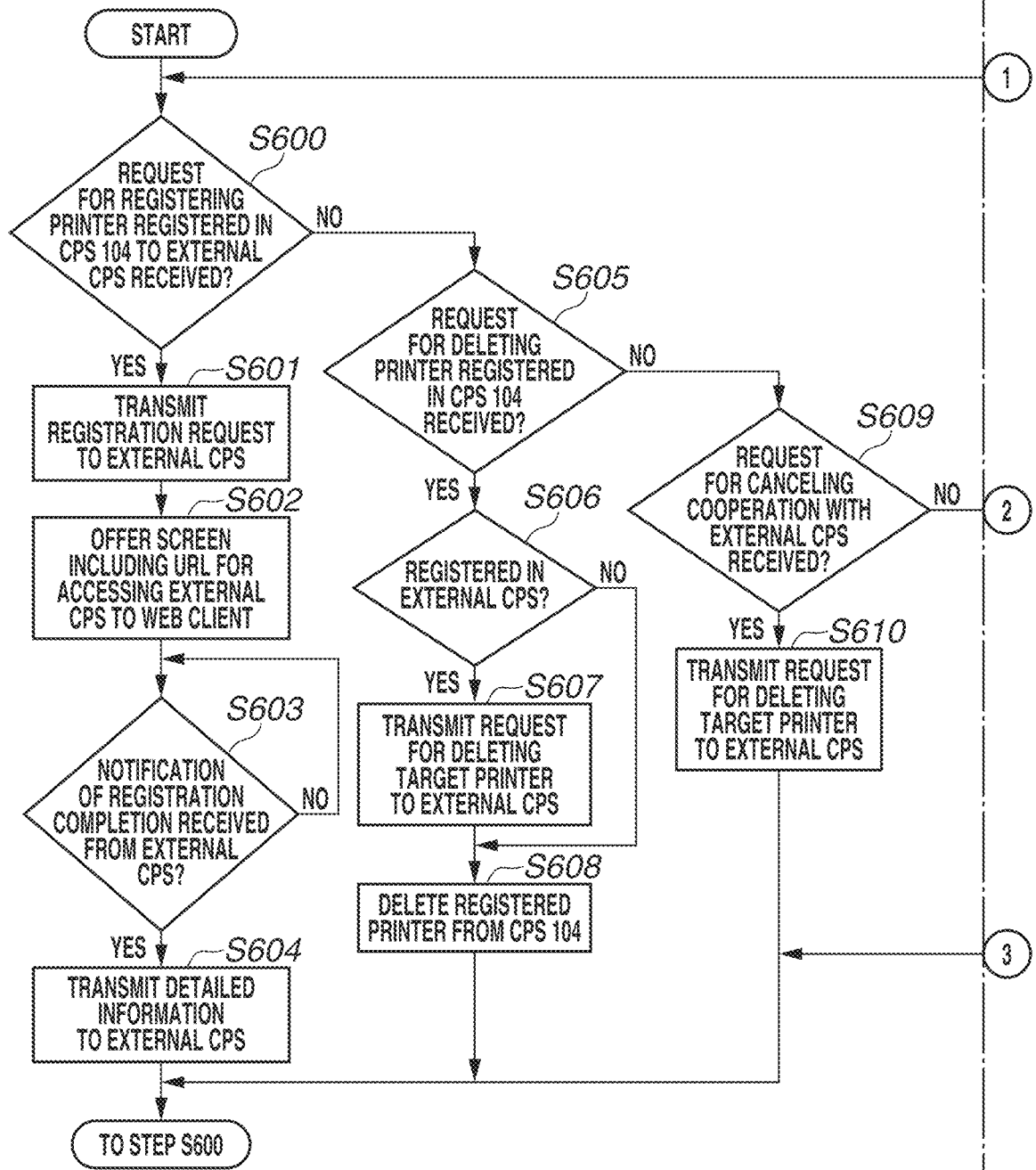
FIGS. 6A and 6B are a flowchart illustrating an example of control performed by a server for offering the CPS.
Figure 6B:
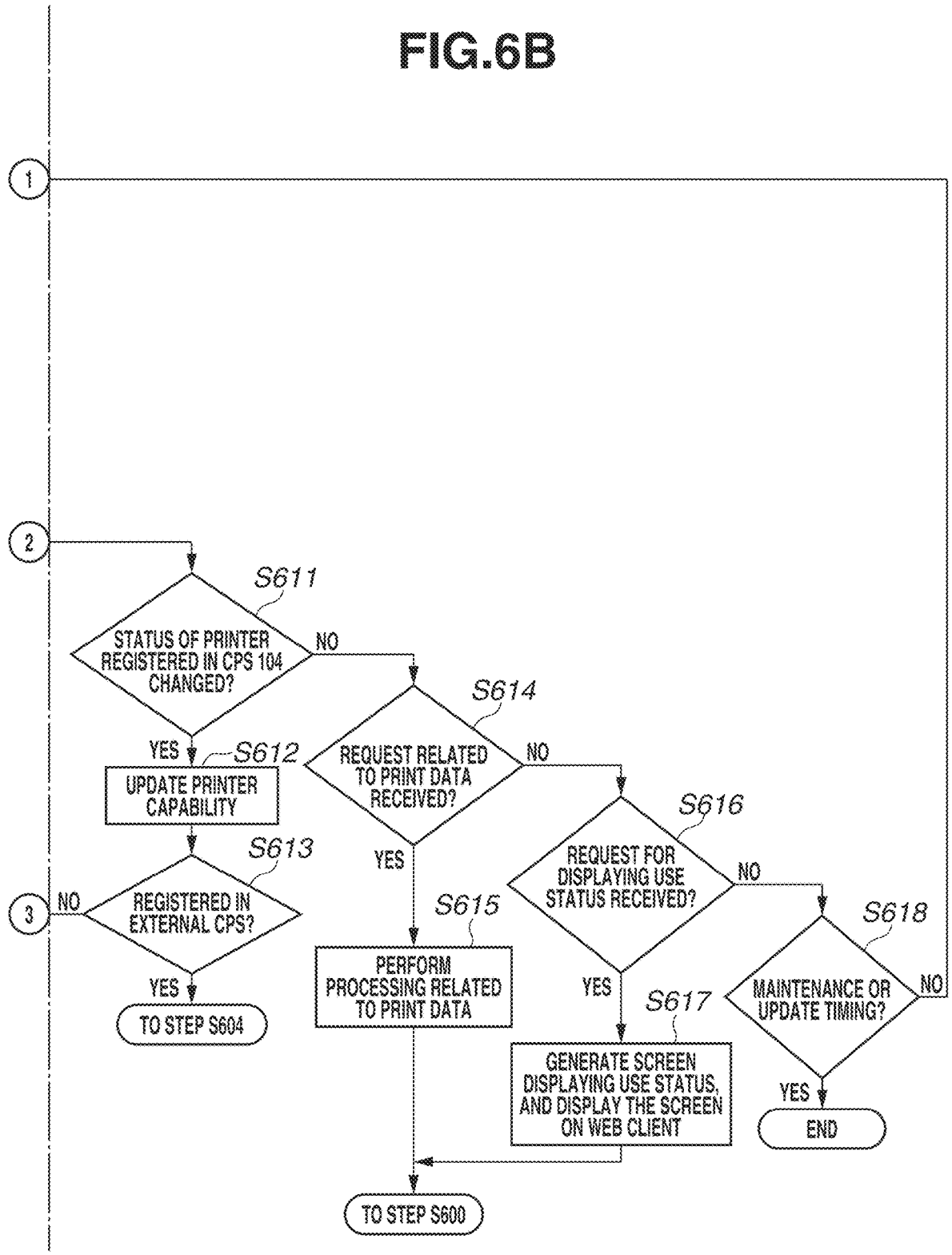
Figure 7A:
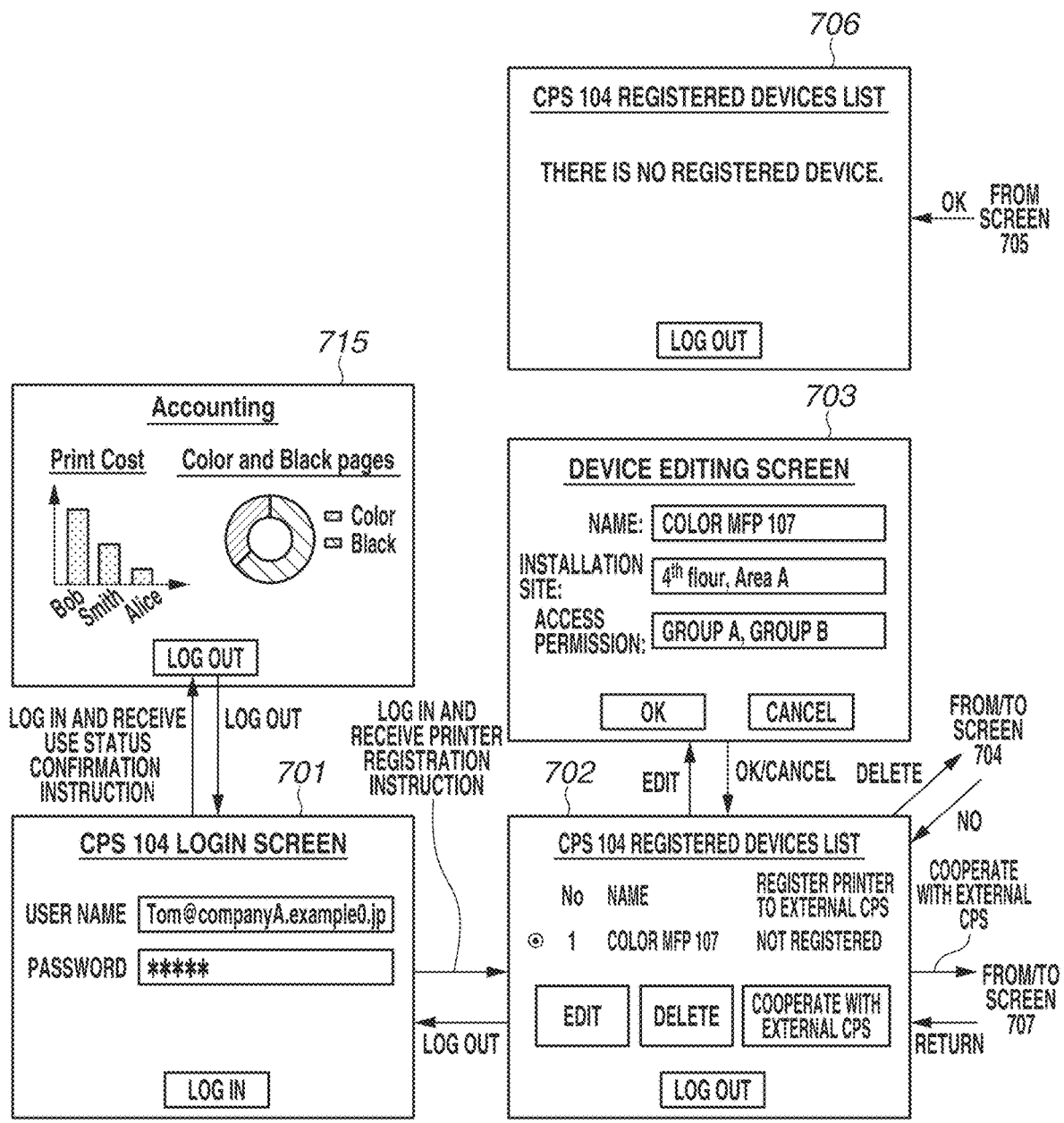
FIGS. 7A and 7B are diagrams illustrating examples of screens displayed on an operation unit of a client terminal.

Control for cooperating the external CPS and the CPS 104 will be described with reference to FIGS. 5A to 10. FIG. 5A is a sequence diagram illustrating an example of processing for printer registration to the external CPS. FIG. 5B is a sequence diagram illustrating an example of cooperation processing. FIGS. 6A and 6B illustrate an example of a flowchart performed by the server 200 for offering the CPS 104. FIGS. 7A to 8 illustrate examples of operation screens related to this control. FIGS. 9A and 9B illustrate examples of information used for the registration processing. FIG. 10 illustrates an example of user information stored in the authentication DB 308.

With reference to FIG. 5A, a registration sequence is described. In step S501, the user accesses the web page offered by the CPS 104 and logs into the CPS 104 by using the account of the user having the settings management right of the tenant "companyA".

The screen transition related to the registration processing will be described with reference to FIGS. 7A and 7B. The user accesses the web page for logging into the CPS 104 by using the web browser. As a result, the web browser displays a login screen 701. More specifically, upon reception of the access request, the transmission and reception unit 301 of the CPS 104 transfers receive data to the control unit 302. The control unit 302 interprets the access request, generates response data via the page generation unit 303, and transmits a login screen 701 to the client terminal via the transmission and reception unit 301.

The user inputs the administrator user name and password pre-registered in the CPS 104 via the login screen 701 and attempts a web login to the CPS 104. When the web login is successful, a main menu screen (not illustrated) is displayed. The user corresponding to the account "Tom@companyA.example0.jp" has the administrator authority of the tenant as indicated by the user authentication DB illustrated in FIG. 10. Accordingly, when the input password is correct, the login is successful.

The user selects a link for causing a screen to transition from the main menu screen to the screen of the lower layer and then makes various settings. In this case, the screen related to the registration of a cloud print service will be described below.

Upon reception of the Hyper Text Transfer Protocol (HTTP) request for causing a screen to transition to the printer registration screen occurring in response to a user operation via the web browser, the CPS 104 generates a list screen 702 and transmits the screen to the client terminal. The administrator can change the settings of the CPS 104 and perform a registration operation on the external CPS via the screen 702 displayed on the client terminal. The screen 702 displays an example case where the MFP 107 has been registered as a printer usable by the CPS 104 through registration control illustrated in FIG. 4.

The "Name" field denotes the device name of the MFP 107 registered in the CPS 104 and is the name for identifying the printer. The "Register Printer to External CPS" field is an area indicating whether the MFP 107 has been registered in the external CPS. In this example case, the MFP 107 has not been registered in the external CPS. The "Edit" button is used to edit the settings of a registered cloud printer. The "Delete" button is used to delete a registered cloud printer. The "Cooperate with External CPS" button is used to set the cooperation between the registered cloud printer and the external cloud print service. The "Log Out" button is used to log out of the CPS 104.

When the "Edit" button is selected, the display screen shifts to a screen 703. The user can edit registered device information through the screen 703. For example, the device name, installation site, and access permission users list can be edited. The "Access Permission" list displays items for setting user accounts, groups, and roles, which can access this device. In this example setting, users of Groups A and B can access this device. As illustrated in FIG. 10, the user authentication DB 308 corresponding to the tenant "companyA" stores, for example, the user name, belonging group, role, and account name of the external CPS. The screen 703 displays an example case where Groups A and B are permitted to access. In this case, Tom, Alice, and Bob are permitted to use this device, and Smith is not permitted to use the device. The settings made through the screen 703 are stored in the setting DB 307. The table illustrated in FIG. 10 stores not only user information for the CPS 104 but also correspondence information indicating the correspondence between the user account for the CPS 104 and the user account for the external CPS. The correspondence information is preset by a user such as the administrator.

The screen 702 will be described again. When the "Cooperate with External CPS" button is selected with a specific device selected, the CPS 104 shifts the display screen on the web browser to a screen 707.

When the "Register" button is selected on the screen 707, the CPS 104 shifts the display screen on the web browser to a screen 710 illustrated in FIG. 8. The screen 710 is an example of a screen for selecting the external CPS to which the CPS 104 is to be registered. In this example, the CPS 105 is selected as the registration destination external CPS and "Color MFP 107" is set as the name of the device to be registered. The registration destination external CPS and the device name can be changed based on a user operation via the screen 710. When the "Execute Registration" button is selected, the CPS 104 performs the registration processing.

The sequence illustrated in FIG. 5A will be described again. Upon reception of the user operation for selecting the "Execute Registration" button, in step S502, the client terminal transmits data indicating the selection of "Execute Registration" to the CPS 104.

Upon reception of the data indicating the selection of "Execute Registration", in step S503, the CPS 104 transmits a registration request to the CPS 105. More specifically, the setting management unit 304 of the CPS 104 refers to an external CPS destination Uniform Resource Locator (URL) list stored in the setting DB 307 and confirms the registration destination URL of the CPS 105. FIG. 9B illustrates an example of an external CPS destination URL list stored in the setting DB 307. The setting management unit 304 refers to the list and acquires "https://check.example1.jp" as the registration destination URL of the CPS 105. The CPS 104 transmits a device registration request to the registration destination URL.

Upon reception of the device registration request, in step S504, the CPS 105 transmits as a response to the CPS 104 the URL to input authentication information and a temporary password (PIN code according to the present exemplary embodiment) for authentication. The URL is, for example, "https://tempcheck.example1.jp".

Upon reception of the response from the CPS 105, in step S505, the CPS 104 generates a screen 711 illustrated in FIG. 8 based on the information and transmits the generated screen 711 to the web browser of the client terminal.

The administrator confirms the screen 711 and then accesses the displayed URL by using the web browser. The CPS 105 offers a screen 712 as a response for the access request.

The user inputs the user account information for the CPS 105 and the PIN code (issued in step S504) via the screen 712.

Upon selection of the "OK" button, in step S506, the web browser transmits data indicating the user information and PIN code input via the screen 712 to the CPS 105.

Upon reception of the data indicating the user information and PIN code, in step S507, the CPS 105 performs the authentication processing. In step S508, when the CPS 105 determines that the authentication processing is successful, the CPS 105 performs processing for registering the cloud printer based on the request received in step S503.

In step S509, the CPS 105 transmits a registration success notification and information about the access token to be used for subsequent communication, to the CPS 104.

Upon reception of the registration success notification, in step S510, the CPS 104 transmits completion screen data to the client terminal. Upon reception of the completion screen data, the web browser of the client terminal displays a completion screen based on the received screen data. A screen 713 illustrated in FIG. 8 is an example of the completion screen. Upon selection of the "OK" button, the CPS 104 shifts the display screen on the web browser to a list screen 714 on which the registration information to the external CPS has been updated. The screen 714 displays information indicating that the color MFP 107 has been registered in the CPS 105.

In step S511, the CPS 104 transmits detailed device information to the external CPS. In this case, the CPS 105 uses Internet Printing Protocol (IPP), as indicated in information 910 illustrated in FIG. 9B. Based on the capability information on the cloud printer corresponding to the MFP 107, the setting management unit 304 of the CPS 104 generates the capability information having the IPP format as in information 900 illustrated in FIG. 9A. The control unit 302 transmits the generated capability information.

Upon reception of the capability information, the CPS 105 updates the capability information on the cloud printer with the CPS 104 set as a destination, based on the received capability information.

Through the above-described series of processing, the cloud printer registered in the CPS 104 can be registered as a destination device (printer) usable from a print client supporting the external CPS 105.

<Synchronization Processing>

Figure 7B:
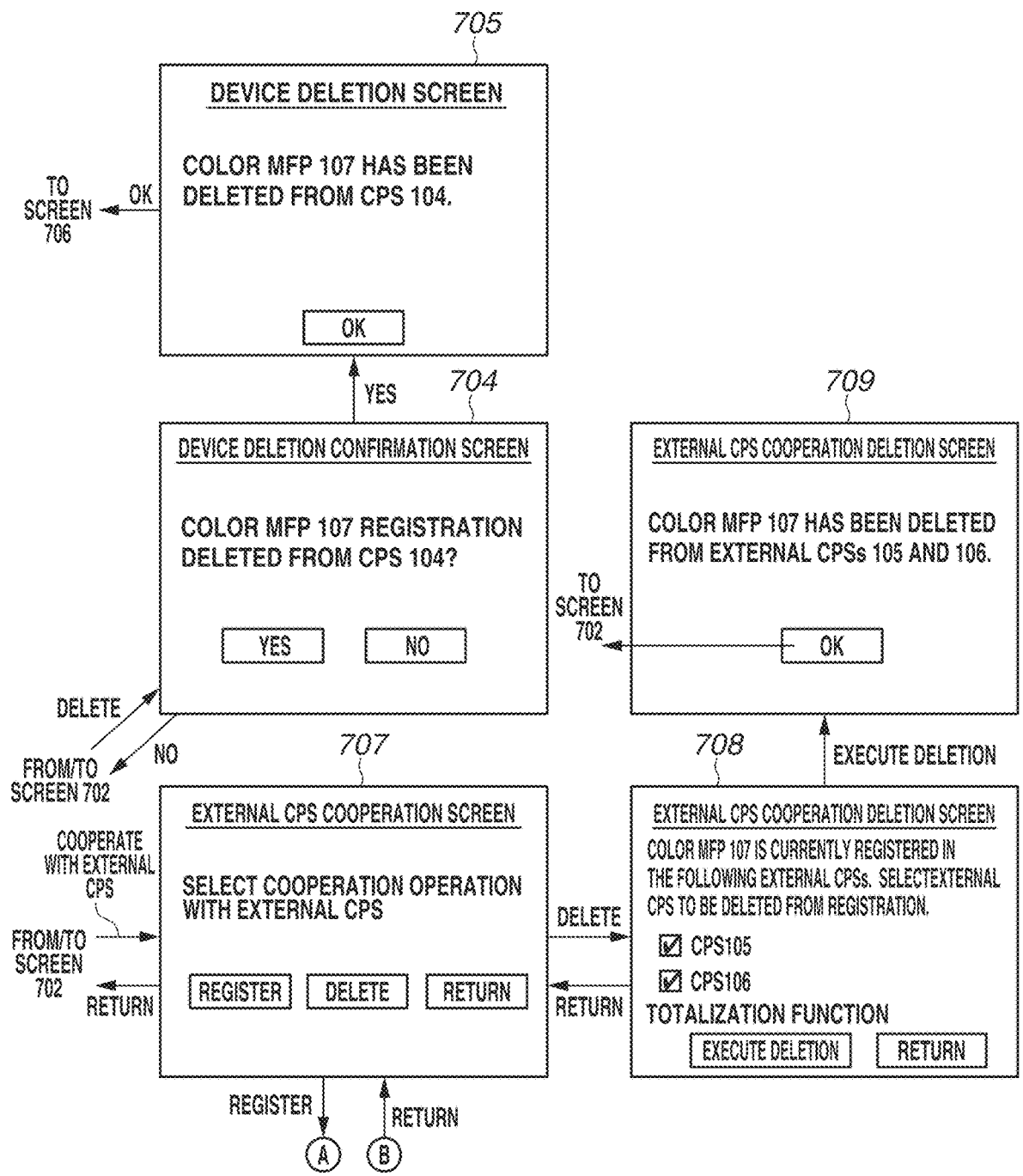
Figure 8:
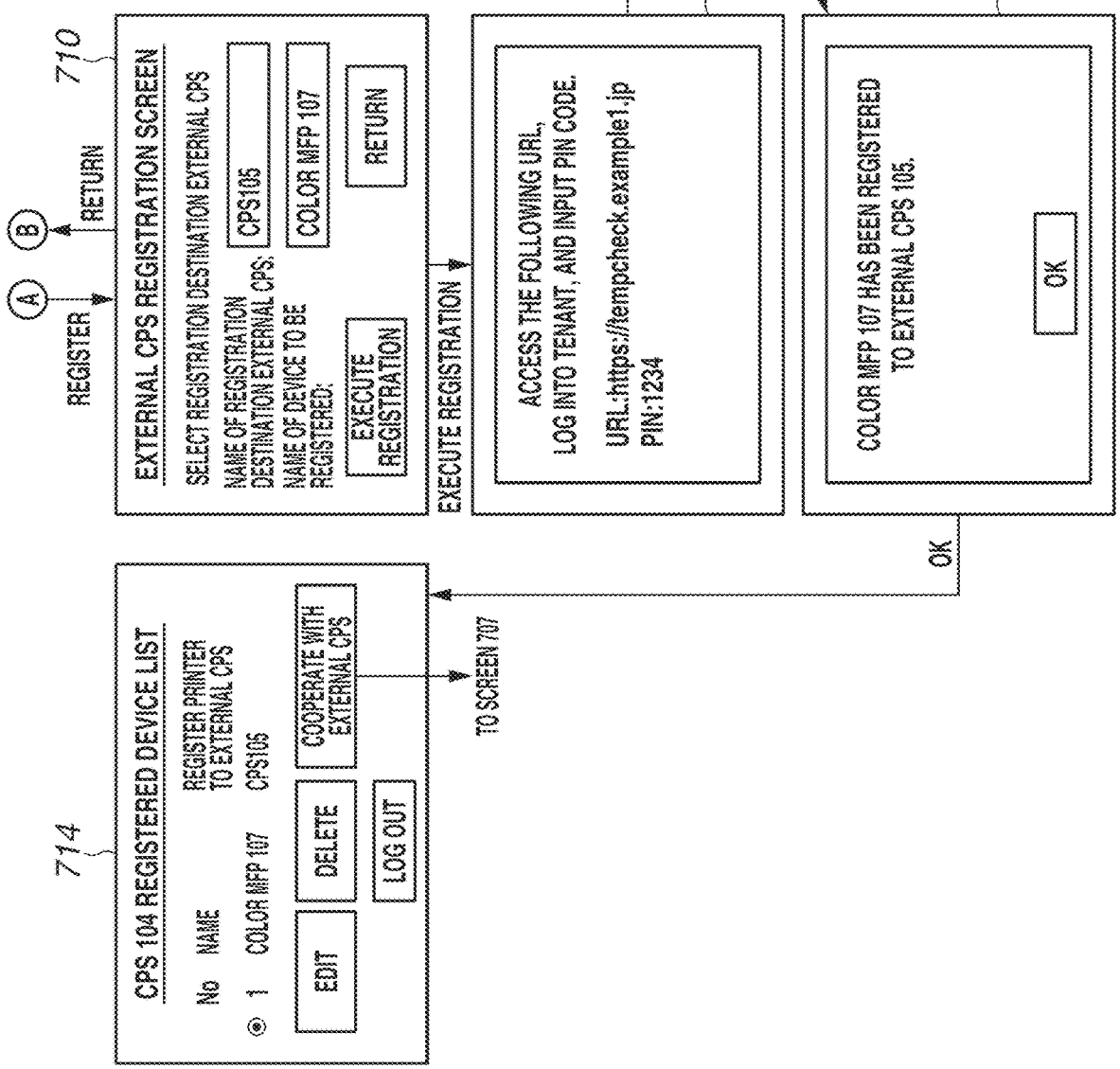
FIG. 8 is a diagram illustrating examples of screens displayed on the operation unit of the client terminal.

The registered printer illustrated in FIG. 5A may be deleted with the "Delete" button illustrated in FIGS. 7A and 7B. The information about the installation site of the printer may be changed with the "Edit" button. If a printer is deleted from the CPS 104, the registration of the actual destination printer is canceled. Therefore, even if a print job is acquired from the CPS 105, a print error results. Therefore, control is performed to delete the printer registered in the external CPS in association with the delete processing for deleting the registered printer from the CPS 104.

The status of the MFP 107 may vary. Examples of status variations include run-out of paper, run-out of coloring material (toner and ink), and low coloring material. Control is performed to synchronize status variations and changes of the installation site information.

Specific processing will be described with reference to the sequence diagram illustrated in FIG. 5B and the setting screens illustrated in FIGS. 7A and 7B. When the "Delete" button is selected via the screen 702, the CPS 104 shifts the display screen on the web browser to a screen 704.

Upon selection of the "YES" button, in step S551, the web browser of the client terminal transmits the data input via the screen 702 to the CPS 104. Upon reception of the data, the CPS 104 determines whether the device to be deleted has been registered in the external CPS. In this example, the device to be deleted has been registered in the external CPS 105.

If the cloud printer to be deleted has been registered in the external CPS, in step S552, the CPS 104 transmits a deletion request of the registered device information to the external CPS (CPS 105 in this case).

Upon reception of the deletion request, in step S553, the CPS 105 performs deletion processing on the target device.

After transmitting the deletion request to the CPS 105, the CPS 104 deletes the cloud printer corresponding to the MFP 107 registered in the CPS 104. More specifically, in step S554, the CPS 104 deletes the information related to the MFP 107 from the setting DB 307.

If no cloud printer has been registered in the external CPS, the processing in steps S552 and S553 is skipped. If the administrator performs an operation for deleting only the cloud printer registered in the external CPS without deleting the registration (from the CPS 104) on the screen 708 illustrated in FIG. 7B, the processing in step S554 is skipped. For example, when the "Execute Deletion" button is selected via a deletion screen 708 displayed upon selection of the "Delete" button on the screen 707, the processing in step S554 is skipped.

Next, the synchronization processing will be described. This processing is performed when the status of the MFP 107 changes. In step S561, the MFP 107 transmits a status change notification to the CPS 104. Upon reception of the notification of status change, in step S562, the CPS 104 acquires the capability information from the MFP 107 and updates the capability information of the cloud printer.

In step S563, the CPS 104 transmits a status change request to the external CPS 105. Upon reception of the request, the CPS 105 issues an inquiry about detailed capability information to the CPS 104 and acquires the updated capability information from the CPS 104. In step S564, based on the acquisition result, the CPS 105 updates the capability and status of the cloud printer registered in the CPS 105.

The series of sequences illustrated in FIG. 5B achieves the suitable association between the CPS 104 and the external CPS, as described above with reference to FIG. 5B.

Next, control performed by the CPS 104 will be described with reference to a flowchart illustrated in FIGS. 6A and 6B. Each operation (step) in the flowchart illustrated in FIGS. 6A and 6B is implemented when the CPU 201 loads the program corresponding to each control module for offering the CPS 104 stored in the ROM 202 or the storage 204, into the RAM 203, and then executes the program. The virtualization and containerization techniques will be suitably used to implement appropriate control on a plurality of tenants.

In this case, a service control operation to be offered to users belonging to the tenant "companyA" will be described. In the flowchart illustrated in FIGS. 6A and 6B, processing for registering a new printer to the CPS 104 illustrated in FIG. 4 is omitted to simplify descriptions.

In step S600, the control unit 302 determines whether a request for additionally registering a printer registered in the CPS 104 to the external CPS is received from the client terminal via the network I/F 205 and the transmission and reception unit 301. When the request for additionally registering a printer registered in the CPS 104 to the external CPS is received (YES in step S600), the processing proceeds to step S601. On the other hand, when the request for additionally registering a printer registered in the CPS 104 to the external CPS is not received (NO in step S600), the processing proceeds to step S605.

In step S601, the control unit 302 refers to the list of the setting DB 307 by using as a key the CPS name included in the received registration request and acquires the registration destination URL. The control unit 302 collaborates with the transmission and reception unit 301 to transmit a registration request including the device identifier to the destination specified by the acquired URL. Upon acquisition of the URL to input authentication information and the PIN code for authentication as a response to the request, the processing proceeds to step S602.

In step S602, the control unit 302 collaborates with the page generation unit 303 to generate a screen 711 including information indicating the URL acquired in step S601 and the PIN code. Subsequently, the control unit 302 collaborates with the transmission and reception unit 301 to transmit the generated screen 711 to the client terminal as the request transmission source. Although the present exemplary embodiment has been described exemplifying a case where the screen 711 is transmitted, the present invention is not limited thereto. For example, the screen displayed on the client terminal can be redirected to the web page of the external CPS. In this case, using the "URL & PIN Code" format as the redirection destination URL enables notifying the redirection destination external CPS of the PIN code.

In step S603, the control unit 302 determines whether a notification of registration completion is received from the external CPS. When the notification of registration completion is received (YES in step S603), the processing proceeds to step S604. On the other hand, when the notification of registration completion is not received (NO in step S603), the control unit 302 waits for reception of the notification.

In step S604, the control unit 302 collaborates with the setting management unit 304 and the transmission and reception unit 301 to transmit detailed information to the external CPS. The setting management unit 304 generates the capability information with a format suitable for the communication protocol and print protocol used by the external CPS, based on the capability information about the cloud printer managed by the setting management unit 304 itself. The control unit 302 collaborates with the transmission and reception unit 301 to transmit the capability information generated by the setting management unit 304 to the external CPS.

In step S605, the control unit 302 determines whether a request for deleting a cloud printer registered in the CPS 104 is received. When the request for deleting a cloud printer registered in the CPS 104 is received (YES in step S605), the processing proceeds to step S606. On the other hand, when the request for deleting a cloud printer registered in the CPS 104 is not received (NO in step S605), the processing proceeds to step S609. More specifically, when the control unit 302 receives an HTTP request transmitted upon selection of the "YES" key on the screen 704, the control unit 302 determines that the request is received.

In step S606, the control unit 302 collaborates with the setting management unit 304 to refer to the setting DB 307 to determine whether the external CPS is registered in association with the cloud printer to be deleted. When an external CPS is registered in association with the cloud printer to be deleted (YES in step S606), the processing proceeds to step S607. On the other hand, when no external CPS is registered in association with the cloud printer to be deleted (NO in step S606), the processing proceeds to step S608.

In step S607, the control unit 302 transmits a request for deleting the printer to be deleted to the external CPS. Then, the processing proceeds to step S608.

In step S608, the control unit 302 deletes the cloud printer to be deleted from the cloud printers managed by the setting management unit 304. Upon completion of deletion, the control unit 302 waits for reception of another request. Upon completion of deletion, the CPS 104 shifts the display screen on the client terminal to a screen 705. Upon selection of the "OK" button via the screen 705, the CPS 104 shifts the display screen on the client terminal to a list screen 706.

In step S609, the control unit 302 determines whether a request for canceling the cooperation with the external CPS is received. When the request for canceling the cooperation with the external CPS is received (YES in step S609), the processing proceeds to step S610. On the other hand, when the request for canceling the cooperation with the external CPS is not received (NO in step S609), the processing proceeds to step S611. The control unit 302 determines that the request is received when the control unit 302 receives an HTTP request transmitted upon selection of the "Execute Deletion" button on the screen 708.

In step S610, the control unit 302 identifies the printer to be a target of the cooperation cancellation and transmits a deletion request to the external CPS in which the printer is registered. The CPS 104 shifts the display screen on the client terminal as the request source to a screen 709. Upon completion of transmission, the CPS 104 waits for reception of another request.

In step S611, the control unit 302 determines whether the status of the printer registered in the CPS 104 has been changed. When the status of the printer has been changed (YES in step S611), the processing proceeds to step S612. On the other hand, when the status of the printer has not been changed (NO in step S611), the processing proceeds to step S614. When processing for changing the device information on the screen 703 is performed and when a status change is notified from the registered printer, the control unit 302 determines that the status of the printer has been changed.

In step S612, the control unit 302 updates the capability information of the cloud printer managed by the print management unit 306. In step S613, the control unit 302 determines whether the external CPS is associated with the cloud printer of which the capability information has been updated. When the external CPS is associated with the cloud printer (YES in step S613), the processing proceeds to step S604. On the other hand, when the external CPS is not associated with the cloud printer (NO in step S613), the control unit 302 waits for reception of another request. In step S604, the control unit 302 performs the above-described update processing. Accordingly, the capability and status of the cloud printer managed by the CPS 104 can be synchronized with the external CPS.

In step S614, the control unit 302 determines whether a request related to a print job is received. When a request related to a print job is received (YES in step S614), the processing proceeds to step S615. On the other hand, when a request related to a print job is not received (NO in step S614), the processing proceeds to step S616.

In step S615, the control unit 302 collaborates with each unit to perform processing based on the request. For example, the control unit 302 receives a print job from the external CPS and performs processing for storing the print job. For example, the control unit 302 performs processing for transmitting a stored print job to a printing apparatus such as the MFP 107, and processing for deleting a stored print job. The control unit 302 performs processing for updating the print history based on print data. Specific control will be described below. Upon completion of the processing, the control unit 302 waits for reception of further processing.

In step S616, the control unit 302 determines whether a request for displaying the use status is received from the client terminal. When the request for displaying the use status is received (YES in step S616), the processing proceeds to step S617. On the other hand, when the request for displaying the use status is not received (NO in step S616), the processing proceeds to step S618.

In step S617, the control unit 302 collaborates with the print management unit 306 to acquire the printing-related use status including the user's use records and the number of printed sheets per month totalized in the print history DB 310. Subsequently, the control unit 302 collaborates with the page generation unit 303 to generate a report screen 715 for displaying a summary report based on the acquired use information. The control unit 302 also collaborates with the transmission and reception unit 301 to transmit the generated report screen 715 to the client terminal as the request transmission source.

The report screen 715 will be described with reference to FIGS. 7A and 7B. The report screen 715 enables the user to select a link for confirming the use status from a main menu screen (not illustrated) displayed on the web browser of the client terminal. Upon selection of the link, the web browser transmits HTTP request data indicating the selected link destination to the CPS 104. In step S616, the control unit 302 determines that the request for displaying the use status is received when the HTTP request is received.

The report screen 715 displays, for example, a printing-related report including a graph indicating the printing cost for each user and the ratio of color printing to monochrome printing for each tenant. However, it is not limited thereto. The report screen 715 also may display the number of printed sheets for each user and the ratio of copying to printing.

Now the flowchart illustrated in FIGS. 6A and 6B will be described again. In step S618, the CPS 104 determines whether the current timing is the maintenance or update timing. When the current timing is the maintenance or update timing (YES in step S618), the control unit 302 ends the series of request reception processing. On the other hand, when the current timing is not the maintenance or update timing (NO in step S618), the control unit 302 waits for reception of another request.

<Reception of Print Job>

Figure 13:
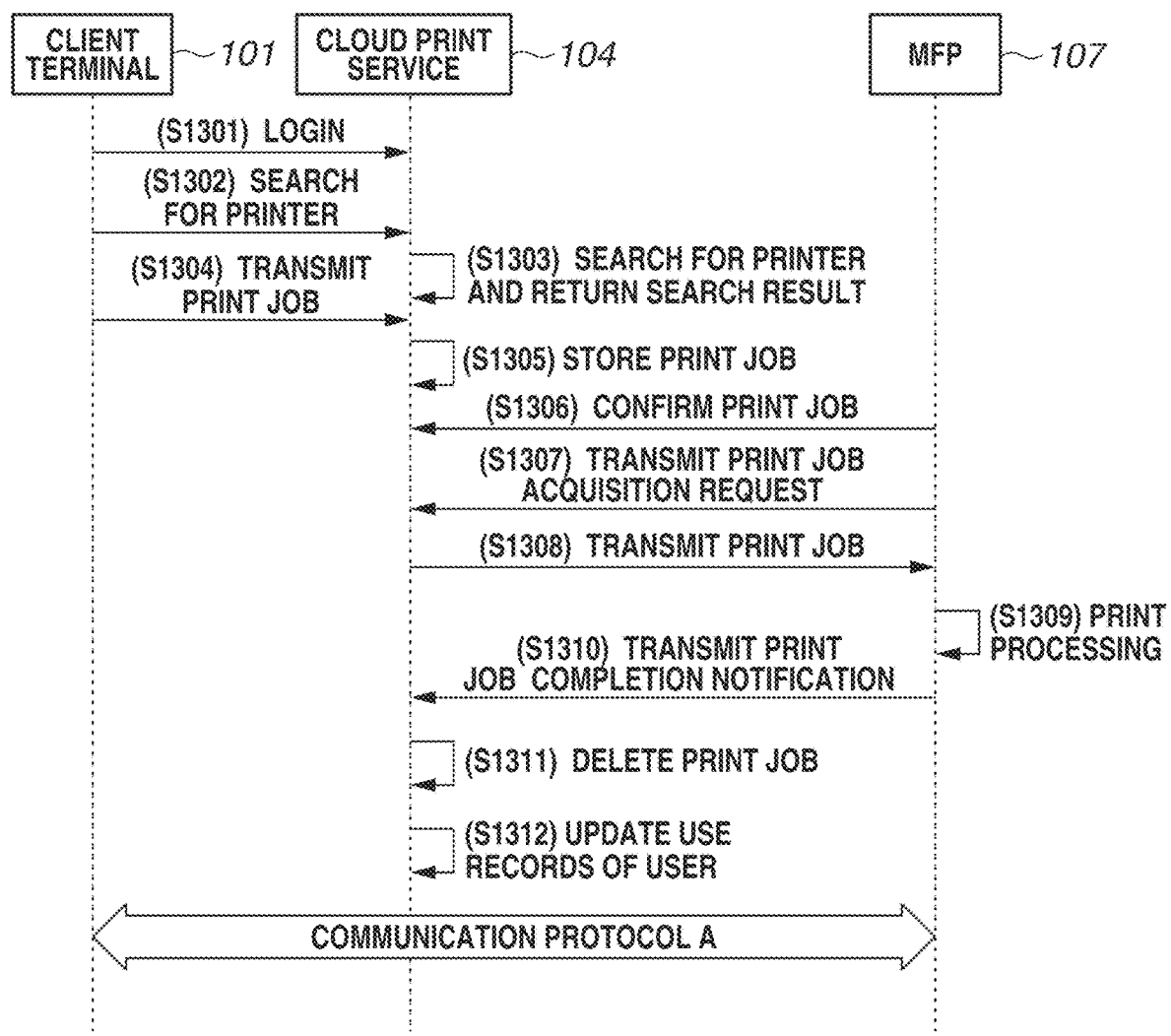
FIG. 13 is a sequence diagram illustrating an example of print processing performed not via an external CPS.

At the end, processing for receiving a print job will be described with reference to FIGS. 11 to 13. FIGS. 11 and 13 illustrate examples of print sequences performed by the CPS 104. FIGS. 12A and 12B illustrate differences between the print job attributes input from the CPS 105 and the print job attributes input to the MFP 107.

The differences will be described exemplifying a case where user Alice performs printing by using the client terminal 102. For example, the client terminal 102 is a cloud print service offered by WindowsOS, and the CPS 105 is a cloud print service offered by Azure. For example, the CPS 105 employs Internet Printing Protocol (IPP) as communication protocol B.

In step S1101, Alice logs into the CPS 105 from the client terminal 102 with the account "aaaAlice@companyA.example1.jp" associated with the cloud platform for offering the CPS 105. In step S1102, the client terminal 102 searches for a printer registered in the CPS 105.

The CPS 105 stores information about the cloud printer working in corporation with the CPS 104 registered in the sequence illustrated in FIG. 5A. Thus, the MFP "Color MFP 107" is found in the search in step S1102.

Alice selects an arbitrary content, sets "Color MFP 107" as the printer to be used for printing, and instructs the printer to start printing. Upon reception of the printing start instruction, in step S1103, the client terminal 102 transmits a print job to the CPS 105. Upon reception of the print job, in step S1104, the CPS 105 stores the print job in a storage.

In step S1105, the CPS 104 confirms whether there exists, in the CPS 105, a print job destined to the cloud printer corresponding to the color MFP 107. According to the exemplary embodiment, the CPS 104 transmits a request for transmitting a print job confirmation to the CPS 105 at predetermined intervals. This polling interval may be the interval specified by the CPS 105 or the interval set in the CPS 104. Instead of the confirmation by polling, the CPS 104 may transmit a Push notification to the CPS 105 to notify the CPS 105 of the presence of a print job.

When the CPS 104 determines that there exists, in the external CPS, a print job destined to the cloud printer managed by the CPS 104 trough polling or a Push notification, in step S1106, the CPS 104 transmits a print job acquisition request to the CPS 105. At this timing, the CPS 104 issues the request by using the access token acquired in step S509. In step S1107, the CPS 105 transmits the print job to the CPS 104. As described above, the present exemplary embodiment assumes a case where the CPS 105 employs the IPP communication protocol. Accordingly, the print job transmitted from the CPS 105 has an IPP-based format, as in print job attributes 1201 illustrated in FIG. 12A. The processing in step S1110 (described below) is also executed based on IPP operations.

Upon acquisition of the print job from the CPS 105, in step S1108, the CPS 104 determines whether the acquired print job is a print job of the user having the right to access the cloud printer resource. First, the control unit 302 determines which user's job the acquired print job is. The control unit 302 acquires the field name "Requesting-user-name" included in the IPP-based print job. In the present exemplary embodiment, a case is assumed where the account name of Alice on the CPS 105 is stored in the attribute value "Requesting-user-name". Subsequently, the control unit 302 collaborates with the authentication unit 305 to refer to authentication information 1000 stored in the authentication DB 308 by using the acquired account name of the external CPS, to identify the account name of Alice on the CPS 104. Then, the control unit 302 acquires information about the group to which "Alice" belongs. Then, the control unit 302 collaborates with the setting management unit 304 to refer to the access permission list stored in the setting DB 307 to determine whether Alice is a user belonging to a group which is permitted to perform printing on the MFP 107. If Alice is not a user belonging to a permitted group, the control unit 302 cancels the acquired print job and transmits a response indicating an access error to the CPS 105. On the other hand, if Alice is a user belonging to the permitted group, in step S1109, the control unit 302 stores the acquired print job in the print job DB 309.

Upon completion of the storage, in step S1110, the CPS 104 issues a notification of completion of print job acquisition to the CPS 105. Upon reception of the notification, in step S1111, the CPS 105 deletes the transmitted print job from the queue corresponding to the destination device.

In step S1112, the CPS 104 converts the data attributes of the print job from the communication protocol format (e.g., IPP) of the CPS 105 to the communication protocol format (e.g., HTTP) employed by the CPS 104. For example, the CPS 104 employs an HTTP-based original protocol. The print management unit 306 of the CPS 104 converts the print attributes of the received IPP-based print job into print job attributes 1202 illustrated in FIG. 12B. In this case, the print management unit 306 replaces the attribute value "Requesting-user-name" with an attribute value "Alice" or "Alice@companyA.example1.jp" interpretable by the CPS 104.

Subsequently, control in which the MFP 107 acquires the print job stored in the CPS 104 and performs printing will be described.

In step S1113, the MFP 107 periodically confirms whether there exists a print job destined to the MFP 107, to the CPS 104 at fixed intervals. This polling interval may be the interval specified by the CPS 104 or the interval set in the MFP 107. Instead of the confirmation by polling, the MFP 107 may confirm the presence of a print job through a Push notification. The MFP 107 implements a request for print job confirmation by transmitting a job confirmation request in which False is stored in the "Which-jobs" attribute indicating the operation for confirming all print jobs destined to the MFP 107. Alternatively, if the MFP 107 is managed on a login basis, the MFP 107 may transmit a request for print job confirmation at the timing when a specific user logs in. In this case, the MFP 107 transmits only a request for confirming a print job of the user who logged in. In this case, for example, the MFP 107 sets the "Which-jobs" attribute to True. The MFP 107 also stores the attribute value indicating the user name and account information of Alice to the attribute "Requesting-user-name" or "Requesting-user-uri" which identifies the user. This operation enables acquiring only a print job of the user who logged into the MFP 107 from the CPS 104. The above-described attribute field and the attribute value are just examples and are not limited thereto.

When the MFP 107 determines that there exists a print job destined to the MFP 107 in step S1113, in step S1114, the MFP 107 transmits a print job acquisition request according to the communication protocol (such as HTTP) employed by the CPS 104. Processing in steps S1116 to S1119 is similar to the processing in steps S407 to S410 illustrated in FIG. 4, and redundant descriptions thereof will be omitted.

The above-described processing enables a print job that is input to the CPS 105 to be acquired by the CPS 104 and then printed via the CPS 104, and also enables the print history to be managed by the CPS 104.

<Print Processing from Client Terminal of CPS 104>

Next, a sequence in which Alice performs print processing via the CPS 104 by using the client terminal 101 will be described below with reference to FIG. 13. In this sequence, it is assumed that an application dedicated for the CPS 104 is installed in the client terminal 101. In step S1301, Alice logs into the CPS 104 from the application dedicated for the CPS 104. "Alice@companyA.example0.jp" and a corresponding password are used as login information. The user may store the login information in the dedicated application or input the information each time of login.

In step S1302, the activated dedicated application requests the CPS 104 to search for a usable printer. The request includes the account name or user name of the CPS 104. Upon reception of the request, in step S1303, the CPS 104 searches for a cloud printer usable by Alice and returns information about the printer usable by Alice. In this example, the cloud printer corresponding to the MFP 107 is returned as the search result as a response.

Then, Alice selects a desired content, sets "Color MFP 107" as the printer to be used, and instructs the printer to start printing. Upon reception of the print start instruction, in step S1304, the dedicated application transmits a print job to the CPS 104. In this example, a first communication protocol (such as HTTP) employed by the CPS 104 is used, and the print job data attributes have a format 1202 illustrated in FIG. 12B. In this case, since the print job can be directly transmitted to the MFP 107, conversion processing is not performed.

Upon reception of the print job transmitted from the dedicated application, in step S1305, the CPS 104 stores the received print job in the print job DB 309. In this way, the CPS 104 can store both a print job acquired from the CPS 105 and a print job received from the client terminal 101.

Processing in steps S1306 to S1312 is similar to the processing in steps S1113 to S1119 illustrated in FIG. 11, and redundant descriptions thereof will be omitted.

As described above, the present exemplary embodiment makes it easier to register a printing apparatus registered in the CPS 104 to a different cloud print services. The present exemplary embodiment also makes it possible to manage use results and job historical information in a unified manner by using one cloud print service. This is because a print job transmitted via different cloud print services is printed via the CPS 104. The present exemplary embodiment further makes it possible to identify the user of the CPS 104 based on the account of the external CPS and totalize the history data. This increases the efficiency of administrative works when a plurality of cloud print services are used together.

The first exemplary embodiment has been described above exemplifying a case where a cloud printer and the destination MFP 107 are associated on a one-to-one basis. A second exemplary embodiment performs the control according to the first exemplary embodiment, and additionally offers a mechanism for registering a plurality of printing apparatuses as one virtual cloud printer and registering the virtual cloud printer to an external CPS.

FIG. 14 illustrates an example of a printing system according to the second exemplary embodiment. The printing system according to the present exemplary embodiment includes color MFPs 1401 and 1402, and a BW-MFP 1403 in addition to the configurations according to the first exemplary embodiment.

The present exemplary embodiment will be described exemplifying a case where cloud printers corresponding to the MFPs 107, 1401, 1402, and 1403 have been registered in the CPS 104. More specifically, the MFPs 107, 1401, 1402, and 1403 have been registered as cloud printers for "companyA.example0.jp" in the CPS 104.

The software and the hardware configurations of the CPS 104 according to the second exemplary embodiment are similar to those according to the first exemplary embodiment. Differences from the first exemplary embodiment will be described.

FIG. 15 illustrates examples of screens offered to the client terminal 101 by the CPS 104. A screen 1501 is displayed instead of the screen 702 illustrated in FIG. 7A. A screen 1502 includes a "Set Virtual Printer" button in addition to the buttons described above with reference to the screen 702. Upon selection of the "Set Virtual Printer" button, the CPS 104 shifts the display screen on the client terminal 101 to the virtual printer setting screen 1502. The administrator and other users can re-register MFPs having similar functions as one virtual cloud printer via the screen 1502. For example, there is a case where the administrator wants to generate a virtual cloud printer collectively having functions of a plurality of color MFPs. In this case, the administrator selects the color MFPs 107, 1401, and 1402 and sets a virtual cloud printer named "Color MFP Series" via the screen 1502. Upon selection of the "OK" button for completing re-registration, the CPS 104 generates a virtual cloud printer queue. Upon completion of the queue generation, the CPS 104 shifts the display screen on the client terminal 101 to a screen 1503.

The capability information on the virtual cloud printer registered through the above-described processing is determined based on the capability information of each of the subordinate MFPs. For example, in a case where A4 and A3 printers are present, the A3 size can be unsupported so that a print job can be reliably output to all of the printers.

In registering this virtual cloud printer to the external CPS, only the printer name and the capability information on the printer are different from those according to the first exemplary embodiment, and the registration and synchronization sequences are similar to those according to the first exemplary embodiment.

When subordinate printing apparatuses of the virtual cloud printer are re-edited and the capability information is updated, the synchronization processing is performed to notify the external CPS of these changes. A print sequence using the virtual cloud printer will be described with reference to FIG. 16.

FIG. 16 illustrates an example of a print sequence via the CPS 104 according to the present exemplary embodiment. In steps S1600a, S1600b, and S1601, the CPS 104 receives a print job from the external CPS (e.g., CPS 105) and the dedicated application of the client terminal 101 and stores the print job in the print job DB 309. This control is similar to that according to the first exemplary embodiment, and detailed descriptions thereof will be omitted.

In the printing configuration using the virtual cloud printer according to the second exemplary embodiment, at a timing when a user logs into any one printing apparatus, a print job is transmitted to the printing apparatus which the user logged into. More specifically, the print job stored in the CPS 104 is not output until an acquisition request is received from any one of the MFPs 107, 1401, and 1402 which are collectively registered as a virtual cloud printer.

In step S1602, the user who input a print job (e.g., Alice) logs into any one subordinate MFP of the virtual cloud printer. Upon reception of the login request of Alice, in step S1603, the MFP transmits a request for acquiring a print job having the user name "Alice" to the CPS 104 based on the login information.

The control unit 302 of the CPS 104 collaborates with the authentication unit 305 and the print management unit 306 to determine whether there is a print job of Alice. If there is a print job of Alice, in step S1604, the control unit 302 transmits the print job to the MFP as the inquiry source. As described above, the user information of the print job received from the external CPS has been updated to the user information corresponding to the CPS 104 in the sequence in step S1112. Therefore, both the print job of Alice input via the external CPS and the print job of Alice input via the dedicated application of the CPS 104 can be transmitted to the printing apparatus.

If there is no print job, the control unit 302 transmits a notification indicating that there is no print job to the printing apparatus. Processing in steps S1605 to S1608 is similar to the processing in steps S407 to S410, and redundant descriptions thereof will be omitted.

Next, processing for editing a virtual cloud printer will be described. Users such as an administrator can edit the name of the virtual cloud printer and the subordinate printers through the above-described screen 1502. Upon selection of the "OK" button on the screen 1502, in step S1611, the web browser of the client terminal 101 transmits an HTTP request indicating a request for updating the virtual cloud printer to the CPS 104. Upon reception of the request, in step S1612, the CPS 104 updates the name of the virtual cloud printer and the subordinate MFPs. The CPS 104 also updates the capability information on the virtual cloud printer.

In step S1613, the CPS 104 transmits a request for updating the capability to the CPS 105 based on the information updated in step S1612. Based on the request, the CPS 105 updates the capability information of the cloud printer on the CPS 105 corresponding to the virtual cloud printer of the CPS 104. Even when a virtual cloud printer is used through this processing, the capability information can be suitably synchronized.

<Importing Settings>

The first and the second exemplary embodiments have been described above exemplifying an example where a printing apparatus registered in the CPS 104 is selected and registered to an external CPS. A third exemplary embodiment will be described exemplifying synchronization processing performed in a case where no printing apparatus is registered in the CPS 104 and a printing apparatus is registered in the external CPS. In the present exemplary embodiment, it is assumed that the user has introduced the external CPS 105, and then determines to introduce the CPS 104, intending to manage both CPSs in a unified manner.

Figure 19:
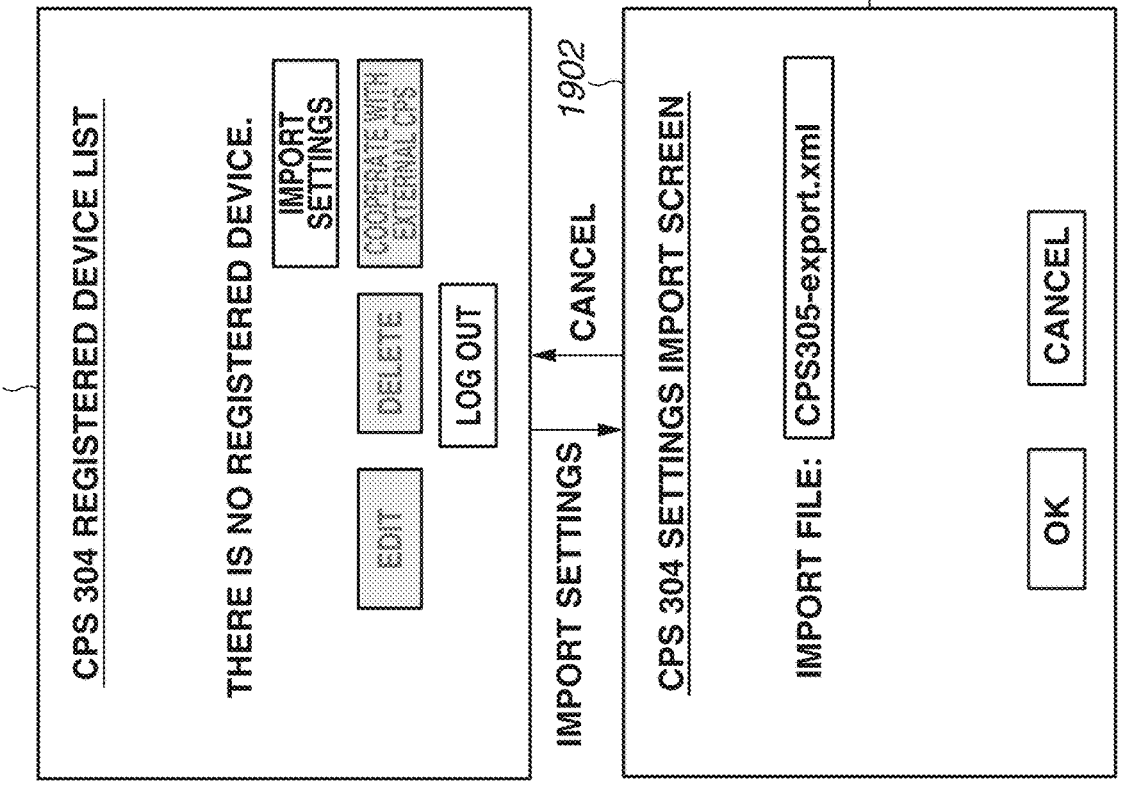
FIG. 19 is a diagram illustrating examples of screens displayed on the operation unit of a client terminal according to the third exemplary embodiment.

FIG. 19 illustrates an example of an operation screen for importing settings to the CPS 104 according to the present exemplary embodiment. A screen 1901 is displayed instead of the screen 702 illustrated in FIG. 7A. The screen 1901 includes an "Import Settings" button in addition to the components of the screen 702.

A function of importing settings specific to the present exemplary embodiment will be described. Upon selection of the "Import Settings" button, the CPS 104 shifts the display screen on the client terminal 101 to a screen 1902.

The user can specify an import file by using the screen 1902. Upon selection of the "OK" button, the web browser of the client terminal 101 uploads the specified import file to the CPS 104. The import file having a format 1700 illustrated in FIG. 17 stores information about the MFP to be registered. This import file can be exported from the external CPS or MFP. A plurality of printing apparatuses may be listed in the import file. This file includes the access token to be presented, when a request to the external CPS is transmitted, together with the request.

Figure 18A:
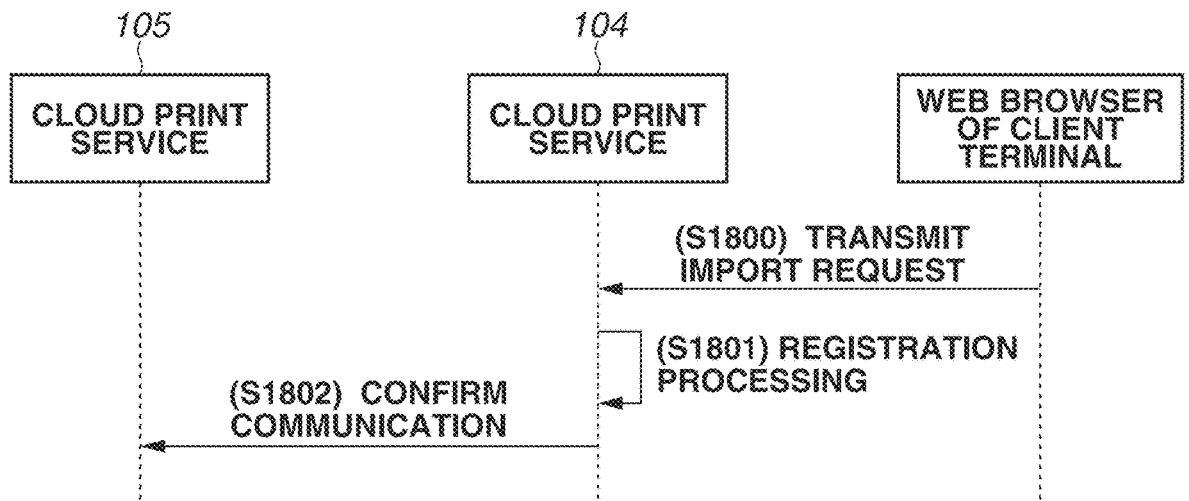
FIGS. 18A and 18B are sequence diagrams illustrating examples of registration control according to the third exemplary embodiment.
Figure 18B:
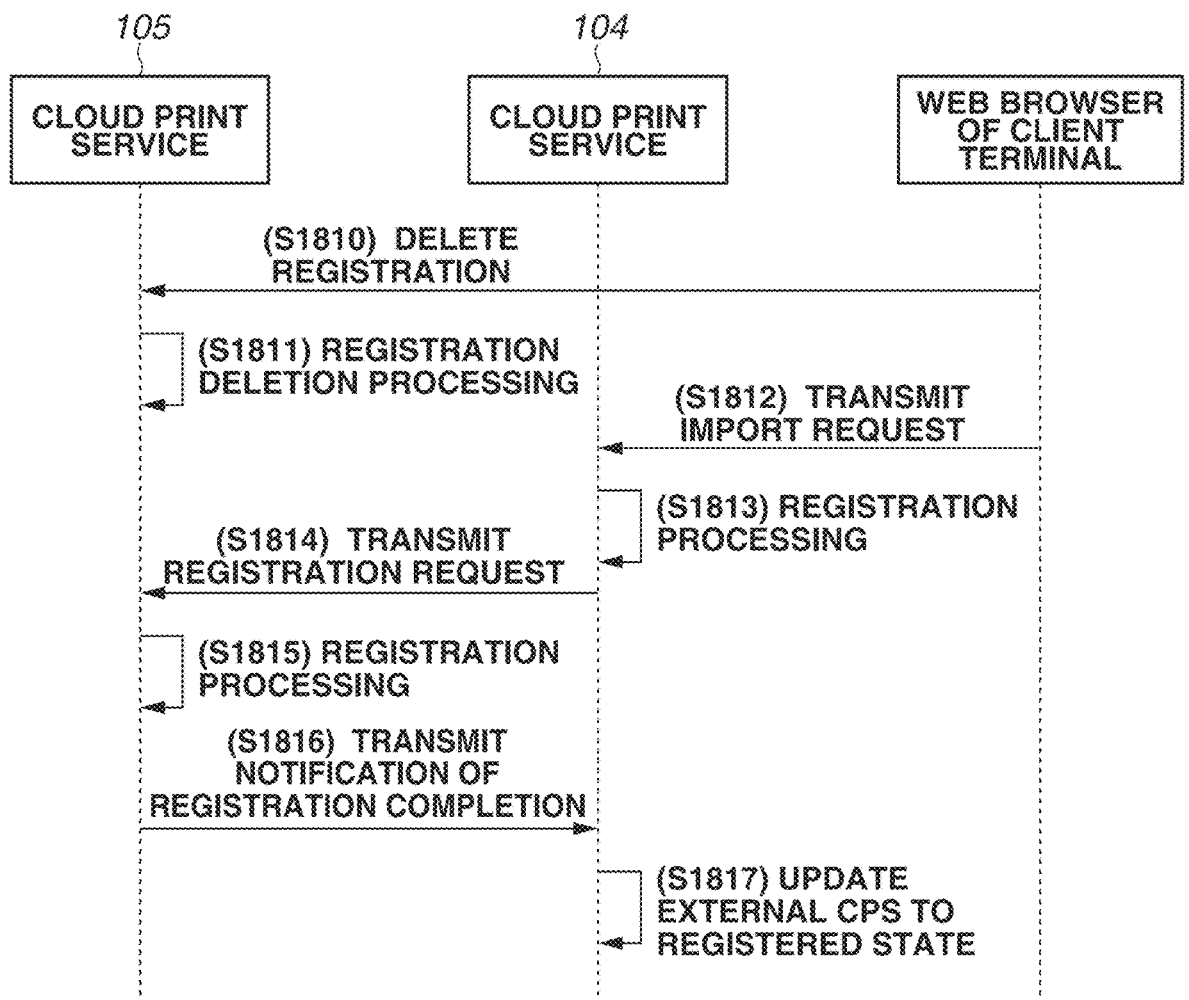

The sequence of the import processing will be described with reference to FIGS. 18A and 18B. FIG. 18A illustrates an example of import processing, and FIG. 18B illustrates a substitute sequence performed when the processing illustrated in FIG. 18A cannot be performed.

In step S1800, the client terminal transmits to the CPS 104 an import request for importing to the CPS 104 the import file specified as the file to be uploaded.

Upon reception of the import file, in step S1801, the CPS 104 performs processing for registering a printing apparatus based on the information stored in the import file. In the registration processing, the CPS 104 performs processing for registering a cloud printer to the CPS 104 as described with reference to FIG. 4. The CPS 104 registers a cloud printer registered in the CPS 104 as a destination device (printer) usable by the CPS 105 as described with reference to FIG. 5A. Finally, the CPS 104 issues a deletion request for deleting the cloud printer (the cloud printer having been used to directly transmit a print job to the MFP 107) corresponding to the MFP 107 preregistered in the CPS 105. The CPS 104 may issue an inquiry about whether to delete the cloud printer to the user.

In step S1802, the control unit 302 transmits a connection confirmation to the CPS 105 to confirm that there is no problem. When the communication confirmation is successful, the CPS 104 shifts the display screen on the client terminal to a screen 1903. The above-described processing completes the registration of the CPS 104 as the registered condition in the external CPS 105. If the communication confirmation to the CPS 105 fails, the "Register Printer to External CPS" field is "Not Registered" in the screen 1903 illustrated in FIG. 19, or the registration to the CPS 104 itself is failed.

Information about communication, such as the access token, cannot be exported because of security reasons. A substitute sequence in this case will be described.

The users such as an administrator log into the CPS 105 via the web browser of the client terminal and transmits a deletion request for deleting a registered cloud printer. In step S1810, the web browser of the client terminal transmits the deletion request to the CPS 105. Upon reception of the deletion request, in step S1811, the CPS 105 deletes the target registered cloud printer.

In step S1812, the administrator specifies an import file from the web browser and uploads the import file to the CPS 104. Upon reception of the import file, in step S1813, the CPS 104 registers the printing apparatus described in the information stored in the import file, as a cloud printer to be managed by the CPS 104. In step S1814, the CPS 104 transmits a registration request for registering the registered cloud printer to the CPS 105.

Upon reception of the registration request, in step S1815, the CPS 105 performs registration processing based on the registration request. This registration processing is similar to that described above with reference to FIG. 5A. When the registration is successfully completed, in step S1816, the CPS 105 transmits a notification of registration completion to the CPS 104. Upon reception of the notification of registration completion, in step S1817, the CPS 104 updates external cooperation information corresponding to the cloud printer registered in the processing in step S1815. Upon completion of the update processing, the CPS 104 shifts the display screen on the client terminal to a screen 1903 and completes the import processing.

Subsequent deletion processing, update processing, and print processing are similar to those according to the first and the second exemplary embodiments. This implements the cooperation with the external CPS even in a user environment where the CPS 104 is introduced afterward.

<Modifications>

The first and the second exemplary embodiments have been described above exemplifying a case where cloud printers corresponding to actual printing apparatuses on a one-to-one basis or a virtual cloud printer having a plurality of subordinate printing apparatuses are registered. However, it is not limited thereto. A plurality of cloud printers managed by the CPS 105 can be registered to the external CPS through a single user operation. In this case, in step S503, the CPS 104 transmits registration information of a plurality of printers. The authentication processing in steps S504 to S507 is similar to that illustrated in FIG. 5A. Then, the registration processing, the access token issue processing, and the printer capability update processing in steps S508 to S511 illustrated in FIGS. 5A and 5B need to be repetitively performed for the number of printing apparatuses to be registered. In this case, the users such as an administrator can also reproduce in the external CPS 105 an environment similar to that of the CPS 104 through a simple operation, thus providing high convenience.

In addition, it is also possible to provide a virtual cloud printer for the cooperation with the external CPS in each tenant managed by the CPS 104 and register the virtual cloud printer to the external CPS. In this case, upon selection of the "Register" button via the screen 707, the CPS 104 generates a virtual cloud printer for receiving a print job from the external CPS. Subsequently, the CPS 104 generates the screen 710 for registering the generated virtual cloud printer to the external CPS and then shifts the display screen on the client terminal to the generated screen 710. In this case, for example, "Printing with Service Name" may be used as the name of the registered device. For example, when the CPS 104 is uniFLOW Online®, "Printing with uniFLOW Online" may be used as the name of the registered device. The tenant name may be included in the name of the registered device. A print job received by a virtual cloud printer and then stored in the CPS 104 may be output, for example, upon triggering by a user login to the MFP according to the second exemplary embodiment.

The control according to the above-described exemplary embodiments enables improving the convenience when a plurality of cloud print services is used. The control according to the above-described exemplary embodiments also makes it easier to register a printing apparatus registered in a first cloud print service to a cloud print service different from the first cloud print service.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A system including (a) a first cloud print server system having a first cloud print service and (b) a printer whose information has been registered in the first cloud print service, the first cloud print server system comprising:
at least one memory that stores a set of instructions; and
at least one processor that executes the instructions, the instructions, when executed, causing the first cloud print server to perform operations comprising:
a first receiving unit configured to receive print data from a second cloud print server system that (i) has a second cloud print service in which information of the first cloud print service has been registered and (ii) sends received print data to a printer;
a first sending unit configured to send print data that is based on the print data received by the first receiving unit to the printer whose information has been registered in the first cloud print service;
a second receiving unit configured to receive print data from a client terminal not via the second cloud print server system; and
a second sending unit configured to send print data that is based on the print data received by the second receiving unit to the printer whose information has been registered in the first cloud print service.

2. The system according to claim 1, wherein the printer to which the received print data is to be sent by the second cloud print service is a printer whose information has been registered in the second cloud print service.

3. The system according to claim 1, wherein the first cloud print service the information of which is registered in the second cloud print service is registered as a printer.

4. The system according to claim 1, wherein the first cloud print server system designates a printer name when the information of the first cloud print service is registered in the second cloud print service.

5. The system according to claim 1, wherein the first cloud print server system designates a printer name as information for identifying the first cloud print service when the information of the first cloud print service is registered in the second cloud print service.

6. The system according to claim 1, wherein the print data received by the first receiving unit and the print data received by the second receiving unit are stored in one or a plurality of storage areas.

7. A first cloud print server system having a first cloud print service in which information of a printer is registered, the first cloud print server system comprising:
- at least one memory that stores a set of instructions; and
- at least one processor that executes the instructions, the instructions, when executed, causing the first cloud print server to perform operations comprising:
- a first receiving unit configured to receive print data from a second cloud print server system that (i) has a second cloud print service in which information of the first cloud print service has been registered and (ii) sends received print data to a printer;
- a first sending unit configured to send print data that is based on the print data received by the first receiving unit to the printer whose information has been registered in the first cloud print service;
- a second receiving unit configured to receive print data from a client terminal not via the second cloud print server system; and
- a second sending unit configured to send print data that is based on the print data received by the second receiving unit to the printer whose information has been registered in the first cloud print service.

8. The first cloud print server system according to claim 7, wherein the printer to which the received print data is to be sent by the second cloud print service is a printer whose information has been registered in the second cloud print service.

9. The first cloud print server system according to claim 7, wherein the first cloud print service is registered in the second cloud print service as a printer.

10. The first cloud print server system according to claim 7, designates a printer name when the information of the first cloud print service is registered in the second cloud print service.

11. The first cloud print server system according to claim 7, wherein the first cloud print server system designates a printer name as information for identifying the first cloud print service when the information of the first cloud print service is registered in the second cloud print service.

12. The first cloud print server system according to claim 7, wherein the print data received by the first receiving unit and the print data received by the second receiving unit are stored in one or a plurality of storage areas.

13. A method for a system including (a) a first cloud print server system having a first cloud print service and (b) a printer whose information has been registered in the first cloud print service, the method comprising:
- receiving, by the first cloud print server system, print data from a second cloud print server system that (i) has a second cloud print service in which information of the first cloud print service has been registered and (ii) sends received print data to a printer;
- sending, by the first cloud print server system, print data that is based on the received print data to the printer whose information has been registered in the first cloud print service;
- receiving, by the first cloud print server system, print data from a client terminal not via the second cloud print server system; and
- sending, by the first cloud print server system, print data that is based on the print data received from the client terminal to the printer whose information has been registered in the first cloud print service.

14. The method according to claim 13, wherein the printer to which the received print data is to be sent by the second cloud print service is a printer whose information has been registered in the second cloud print service.

15. The method according to claim 13, wherein the first cloud print service, the information of which is registered in the second cloud print service, is registered as a printer.

16. The method according to claim 13, wherein the first cloud print server system designates a printer name when the information of the first cloud print service is registered in the second cloud print service.

17. The method according to claim 13, wherein the first cloud print server system designates a printer name as information for identifying the first cloud print service when the information of the first cloud print service is registered in the second cloud print service.

18. The method according to claim 13, wherein the print data received by the are stored in one or a plurality of storage areas.

* * * * *

UNITED STATES PATENT AND TRADEMARK OFFICE
CERTIFICATE OF CORRECTION

| | | |
|---|---|---|
| PATENT NO. | : 11,740,842 B2 | Page 1 of 1 |
| APPLICATION NO. | : 17/393223 | |
| DATED | : August 29, 2023 | |
| INVENTOR(S) | : Go Inoue | |

It is certified that error appears in the above-identified patent and that said Letters Patent is hereby corrected as shown below:

In the Claims

Column 20, Lines 34-35 in Claim 1, cancel the text "causing the first cloud print server to perform operations" and insert the following text:
--causing the first cloud print server system to perform operations--

Column 21, Lines 10-11 in Claim 7, cancel the text "causing the first cloud print server to perform operations" and insert the following text:
--causing the first cloud print server system to perform operations--

Signed and Sealed this
First Day of April, 2025

Coke Morgan Stewart
*Acting Director of the United States Patent and Trademark Office*